(12) United States Patent
Epstein et al.

(10) Patent No.: US 12,136,151 B2
(45) Date of Patent: Nov. 5, 2024

(54) GENERATING COLLAGE DIGITAL IMAGES BY COMBINING SCENE LAYOUTS AND PIXEL COLORS UTILIZING GENERATIVE NEURAL NETWORKS

(71) Applicant: Adobe Inc., San Jose, CA (US)

(72) Inventors: Nadav Epstein, Berkeley, CA (US); Alexei A. Efros, Berkeley, CA (US); Taesung Park, Albany, CA (US); Richard Zhang, San Francisco, CA (US); Elya Shechtman, Seattle, WA (US)

(73) Assignee: Adobe Inc., San Jose, CA (US)

( * ) Notice: Subject to any disclaimer, the term of this patent is extended or adjusted under 35 U.S.C. 154(b) by 446 days.

(21) Appl. No.: 17/650,957

(22) Filed: Feb. 14, 2022

(65) Prior Publication Data

US 2023/0260175 A1 Aug. 17, 2023

(51) Int. Cl.
*G06T 11/60* (2006.01)
*G06T 7/90* (2017.01)

(52) U.S. Cl.
CPC ............... *G06T 11/60* (2013.01); *G06T 7/90* (2017.01); *G06T 2207/20084* (2013.01); *G06T 2207/20212* (2013.01)

(58) Field of Classification Search
None
See application file for complete search history.

(56) References Cited

U.S. PATENT DOCUMENTS 10,719,913 B2 * 7/2020 Amirghodsi .......... G06T 3/4053
2021/0097691 A1 * 4/2021 Liu ...................... G06V 10/764
2022/0309672 A1 * 9/2022 Cherian .................... G06T 7/75

OTHER PUBLICATIONS

Irving Biederman. On the semantics of a glance at a scene. Routledge, 2017.
Lucy Chai, Jonas Wulff, and Phillip Isola. "Using latent space regression to analyze and leverage compositionality in GANs". In: arXiv preprint arXiv:2103.10426 (2021).
Ian Goodfellow et al. "Generative adversarial nets". In: Advances in neural information processing systems 27 (2014).
(Continued)

*Primary Examiner* — Yanna Wu
(74) *Attorney, Agent, or Firm* — Keller Preece PLLC

(57) ABSTRACT

The present disclosure relates to systems, methods, and non-transitory computer readable media for generating digital images depicting photorealistic scenes utilizing a digital image collaging neural network. For example, the disclosed systems utilize a digital image collaging neural network having a particular architecture for disentangling generation of scene layouts and pixel colors for different regions of a digital image. In some cases, the disclosed systems break down the process of generating a collage digital into generating images representing different regions such as a background and a foreground to be collaged into a final result. For example, utilizing the digital image collaging neural network, the disclosed systems determine scene layouts and pixel colors for both foreground digital images and background digital images to ultimately collage the foreground and background together into a collage digital image depicting a real-world scene.

14 Claims, 11 Drawing Sheets

(56) References Cited

OTHER PUBLICATIONS

Phillip Isola and Ce Liu. "Scene collaging: Analysis and synthesis of natural images with semantic layers". In: Proceedings of the IEEE International Conference on Computer Vision. 2013, pp. 3048-3055.
Tero Karras et al. "Analyzing and improving the image quality of stylegan". In: Proceedings of the IEEE/CVF Conference on Computer Vision and Pattern Recognition. 2020, pp. 8110-8119.
Steven Liu et al. "Diverse image generation via self-conditioned gans". In: Proceedings of the IEEE/CVF Conference on Computer Vision and Pattern Recognition. 2020, pp. 14286-14295.
Alex Nichol and Prafulla Dhariwal. "Improved denoising diffusion probabilistic models". In: arXiv preprint arXiv:2102.09672 (2021).
Taesung Park et al. "Semantic image synthesis with spatially-adaptive normalization". In: Proceedings of the IEEE/CVF Conference on Computer Vision and Pattern Recognition. 2019, pp. 2337-2346.
Robin Strudel et al. "Segmenter: Transformer for Semantic Segmentation". In: arXiv preprint arXiv:2105.05633 (2021).
Vadim Sushko et al. "You Only Need Adversarial Supervision for Semantic Image Synthesis". In: arXiv preprint arXiv: 2012.04781 (2020).
Richard Zhang et al. "The unreasonable effectiveness of deep features as a perceptual metric". In: Proceedings of the IEEE conference on computer vision and pattern recognition. 2018, pp. 586-595.
Bolei Zhou et al. "Places: A 10 million image database for scene recognition". In: IEEE transactions on pattern analysis and machine intelligence 40.6 (2017), pp. 1452-1464.

\* cited by examiner

GENERATING COLLAGE DIGITAL IMAGES BY COMBINING SCENE LAYOUTS AND PIXEL COLORS UTILIZING GENERATIVE NEURAL NETWORKS

BACKGROUND

In the field of digital image editing, deep generative models have become increasingly effective at producing realistic images from randomly sampled seeds. These models, such as generative adversarial networks ("GANs"), have revolutionized digital image synthesis, enabling photorealistic rendering of complex phenomena such as faces and other object categories. Indeed, GANs have made significant progress in synthesizing images which appear photorealistic. Despite the advances of conventional digital image systems that utilize these models, however, these conventional systems continue to suffer from a number of disadvantages, such as an inability to adapt to complex domains and inaccuracy in generating complicated image structures.

As just suggested, many conventional digital image systems are often rigidly fixed to generating images in constrained, aligned object classes (e.g., cats or human faces). Due to their limiting architectures, existing systems are not geared toward capturing rules of scene formation, often lacking in fidelity and diversity in scene outputs. As a result, the object classes of some existing systems are becoming more constrained over time to accommodate their inflexibility. Consequently, many of these conventional systems struggle to adapt to more complex domains such as scenes of landscapes or cityscapes that depict many different objects together within larger contextual areas such as buildings, sky, and ground.

As a result of their inflexibility, some conventional digital image systems inaccurately generate digital images in scene domains. When applied to scene domains, images output by existing systems often contain nonsensical textural artifacts such as floating pillars, while at the same time failing to produce sensible layouts of real-world scenes. Indeed, experimenters have demonstrated that conventional systems fail to capture all kinds of statistics in real-world images, including first order statistics (e.g., frequency of occurrence in an image), second order statistics (e.g., pairwise cooccurrences where one object type often appears next to another), and spatial distributions (e.g., what objects appear where in an image). Contributing to this inaccuracy, the models of many existing systems tend to over-represent objects with larger spatial areas (e.g., floors, walls, or grass) while under-representing smaller objects such as fences, cabinets, or chairs.

Thus, there are several disadvantages with regard to conventional digital image systems.

SUMMARY

This disclosure describes one or more embodiments of systems, methods, and non-transitory computer readable media that solve one or more of the foregoing or other problems in the art by utilizing a neural network architecture that facilitates accurate, flexible generation of digital images depicting real-world scenes. Indeed, in some embodiments, the disclosed systems utilize a customized generative adversarial network in the form of a digital image collaging neural network having a particular architecture for disentangling generation of scene layouts and pixel colors for different regions of a digital image. In some cases, the disclosed systems break down the process of generating a collage digital image into generating images representing different regions such as a background and a foreground to be collaged into a final result. For example, utilizing the digital image collaging neural network, the disclosed systems determine scene layouts and pixel colors for both foreground digital images and background digital images to ultimately collage the foreground and background together. To accurately and flexibly generate digital images of scenes, the disclosed systems learn parameters for subcomponents of the digital image collaging neural network using a differentiable, compressed dataset to discover regions in digital images that create a feasible output scene.

Additional features and advantages of one or more embodiments of the present disclosure are outlined in the description which follows, and in part will be obvious from the description, or may be learned by the practice of such example embodiments.

BRIEF DESCRIPTION OF THE DRAWINGS

This disclosure describes one or more embodiments of the invention with additional specificity and detail by referencing the accompanying figures. The following paragraphs briefly describe those figures, in which.

DETAILED DESCRIPTION

Figure 1:
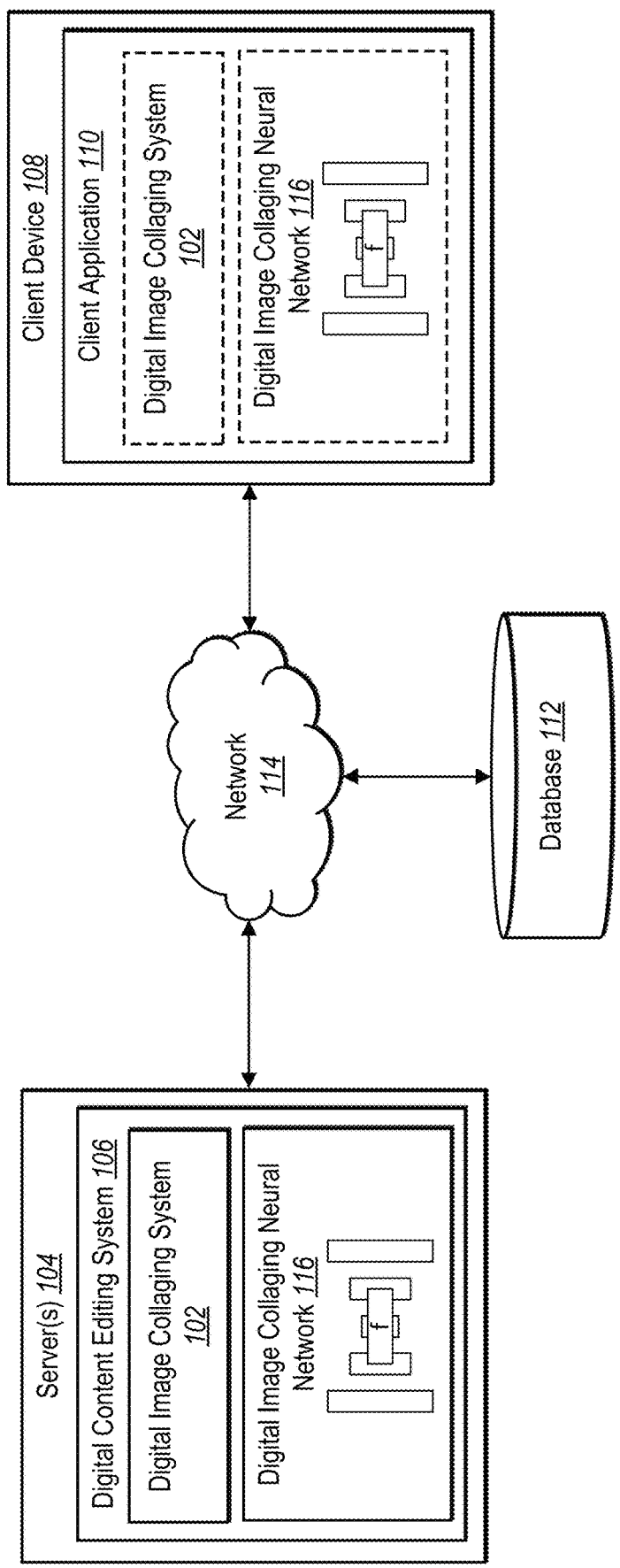
FIG. 1 illustrates an example system environment in which a digital image collaging system operates in accordance with one or more embodiments.

This disclosure describes one or more embodiments of a digital image collaging system that generates collage digital images utilizing a digital image collaging neural network. In particular, the digital image collaging system generates a scene layout and pixel colors for both a background digital image and a foreground digital image and further collages the background and foreground together to form a collage digital image. For example, the digital image collaging system generates a scene layout by utilizing a mask generator neural network to determine or predict regions of a digital image to mask. In some cases, the digital image collaging system generates pixel colors by utilizing a pixel generator neural network to determine or predict pixel colors of a digital image. In certain embodiments, the digital image collaging system further combines the pixel colors and the scene layout into a combined digital image (e.g., a background digital image or a foreground digital image). In some embodiments, the digital image collaging system repeats the process of generating and combining a scene layout and pixel colors for multiple iterations or passes of the digital image collaging neural network, where each iteration generates a digital image for a different region of a final result. To generate accurate scene images, the digital image collaging system learns parameters for the digital image collaging system utilizing an adversarial training process, as described in greater detail below with reference to the figures.

As just mentioned, in one or more embodiments, the digital image collaging system generates a collage digital image by utilizing a digital image collaging neural network over multiple iterations or passes. For example, the digital image collaging system generates a digital image for a first region (e.g., a background) over a first iteration and generates a digital image for a second region (e.g., a foreground) over a second iteration. In some cases, the digital image collaging system generates digital images for additional (e.g., intermediate) regions over additional (e.g., intermediate) iterations of the digital image collaging neural network. In certain embodiments, the digital image collaging system further combines the digital images generated over the various iterations into a collage digital image depicting a realistic scene such as a building, a landscape, or a cityscape.

To generate the individual region-specific digital images, in one or more embodiments, the digital image collaging system utilizes components of a digital image collaging neural network to determine region-specific scene layouts and region-specific pixel colors. For example, the digital image collaging system utilizes a mask generator neural network (e.g., as part of the digital image collaging neural network) to generate a scene layout for a background digital image or a foreground digital image. Indeed, in some cases, the digital image collaging system utilizes the mask generator neural network to generate a background mask for masking regions of a background digital image (e.g., on a first iteration) and a foreground mask for masking regions of a foreground digital image (e.g., on a second iteration).

In certain embodiments, the digital image collaging system further utilizes a pixel generator neural network (e.g., as part of the digital image collaging neural network) to generate or determine pixel colors for different regions of a collage digital image. For example, the digital image collaging system utilizes a pixel generator neural network to generate pixel colors for a background digital image (e.g., on a first iteration) and to generate pixel colors for a foreground digital image (e.g., on a second iteration). In some cases, the digital image collaging system further generates combined digital images specific to each iteration of the digital image collaging neural network—e.g., by combining the scene layout and the pixel colors determined via a first iteration into a background digital image and by combining the scene layout and the pixel colors determined via a second iteration into a foreground digital image. For instance, the digital image collaging system applies the background pixel colors to pixels indicated by the background scene layout to generate a background digital image and applies the foreground pixel colors to pixels indicated by the foreground scene layout to generate a foreground digital image.

As mentioned, in some embodiments, the digital image collaging system generates a collage digital image from the combined digital images. For instance, the digital image collaging system generates a collage digital image that depicts an entire scene by utilizing alpha compositing (or some other blending technique) to merge a background digital image (including its specific scene layout and pixel colors) with a foreground digital image (including its specific scene layout and pixel colors). In certain cases, the digital image collaging system generates collage digital image that accurately represent real-world scenes.

As suggested above, embodiments of the digital image collaging system provide a variety of improvements or advantages over conventional image modification systems. For example, embodiments of the digital image collaging system utilize a novel neural network architecture not found in prior systems. To elaborate, the digital image collaging system utilizes a digital image collaging neural network that includes constituent components such as an encoder neural network, a mask generator neural network, and a pixel generator neural network, and whose parameters are learned over a unique training process (as described below). Indeed, unlike prior generative adversarial networks, the digital image collaging neural network includes both a mask generator neural network and a pixel generator neural network for disentangling scene layout and pixel colors (and for separating regions such as background and foreground).

Due at least in part to implementing a new neural network architecture, in some embodiments, the digital image collaging system improves flexibility over conventional digital image systems. While some existing systems are rigidly fixed to constrained object classes due to limitations in their architectures' ability to capture scene formation, the digital image collaging system can flexibly adapt to rules of scene formation (as explained by Irving Biederman in *On the Semantics of a Glance at a Scene*, Routledge (2017)), exhibiting high fidelity and diversity in scene outputs. For example, the digital image collaging neural network of the digital image collaging system utilizes a mask generator neural network to determine scene layouts and a pixel generator neural network to determine pixel colors and does so over multiple region-specific iterations to generate a final collage digital image.

Additionally, embodiments of the digital image collaging system can improve accuracy over many conventional digital image systems. In contrast with existing systems that generate nonsensical outputs, the digital image collaging system can generate realistic collage digital images by disentangling different aspects (e.g., scene layouts and pixel colors) for different regions of digital images. For example, the digital image collaging neural network of the digital image collaging system generates a background digital image and a foreground digital image (and/or additional layers), each with their own scene layout and pixel colors. Indeed, the digital image collaging neural network learns to capture various statistics found in real-world images, such as first order statistics (e.g., frequency of occurrence in an image), second order statistics (e.g., pairwise cooccurrences where one object type often appears next to another), and spatial distributions (e.g., what objects appear where in an image). Experimenters have demonstrated that, by segmenting generation of digital images specifically into meaningful regions, the digital image collaging system can perform certain tasks such as inversion more accurately. The digital image collaging system can further combine the background and the foreground (and/or the additional layers) to generate a collage digital image that depicts an accurate or realistic real-world scene.

As suggested by the foregoing discussion, this disclosure utilizes a variety of terms to describe features and benefits of the digital image collaging system. Additional detail is hereafter provided regarding the meaning of these terms as used in this disclosure. In particular, the term "neural network" refers to a machine learning model that can be trained and/or tuned based on inputs to generate predictions, determine classifications, or approximate unknown functions. For example, a neural network includes a model of interconnected artificial neurons (e.g., organized in layers) that communicate and learn to approximate complex functions and generate outputs (e.g., generated digital images) based on a plurality of inputs provided to the neural network. In some cases, a neural network refers to an algorithm (or set of algorithms) that implements deep learning techniques to model high-level abstractions in data. For example, a neural network can include a convolutional neural network, a recurrent neural network (e.g., an LSTM), a graph neural network, or a generative adversarial neural network.

As used herein, the term "generative adversarial neural network" (sometimes simply "GAN") refers to a neural network that is tuned or trained via an adversarial process to generate an output digital image from an input such as a noise vector. In some cases, a generative adversarial neural network includes multiple constituent neural networks such as an encoder neural network and one or more generator neural networks. For example, an encoder neural network extracts latent code from a noise vector or from a digital image. A generator neural network (or a combination of generator neural networks) generates a modified digital image by combining extracted latent code (e.g., from the encoder neural network). A discriminator neural network, in competition with the generator neural network, analyzes a generated digital image to generate an authenticity prediction by determining whether the generated digital image is real (e.g., from a set of stored digital images) or fake (e.g., not from the set of stored digital images). The discriminator neural network also causes the digital image collaging system to modify parameters of the encoder neural network and/or the one or more generator neural networks to eventually generate digital images that fool the discriminator neural network into indicating that a generated digital image is a real digital image.

In some embodiments, a generative adversarial neural network can refer to a neural network having a specific architecture such as a digital image collaging neural network. As used herein, a "digital image collaging neural network" refers to a generative adversarial neural network that generates or collages digital images together to generate a final collage digital image. For instance, a digital image collaging neural network generates a collage digital image by collaging region-specific or layer-specific digital images such as a background digital image depicting background pixels and a foreground digital image depicting foreground pixels. In some embodiments, a digital image collage neural network includes component neural networks such as an encoder neural network, a mask generator neural network, and a pixel generator neural network. While learning parameters (e.g., parameters of the encoder neural network, the mask generator neural network, and/or the pixel generator neural network), the digital image collaging neural network also includes a discriminator neural network for adversarial parameter learning. In certain cases, a digital image collaging neural network has a U-Net style architecture.

In some cases, an "encoder neural network" refers to a neural network that, as part of a digital image collage neural network, extracts features from a noise vector and/or a digital image. For example, an encoder neural network extracts latent code from a noise vector, disentangling overall scene layout from specific pixel colors of objects depicted within the image. In some embodiments, an encoder neural network includes specific blocks that are utilized to generate a scene layout code. In these or other embodiments, an encoder neural network includes other blocks that are utilized to generate a pixel color code.

Relatedly, the term "encoded feature" (or sometimes simply "feature") refers to digital information describing all or part of a digital image. For example, features are represented as vectors, tensors, or codes (e.g., latent codes such as scene layout codes or pixel color codes) that the encoder neural network extracts. In some cases, features include observable characteristics or observable information pertaining to a digital image such as a color or a geometric layout. In other cases, features include latent features (e.g., features within the various layers of a neural network and that may change as they are passed from layer to layer) and/or unobservable deep features generated by a swapping autoencoder.

Additionally, the term "generator neural network" refers to a neural network that, as part of a swapping autoencoder, generates all or part of a custom digital image. For example, a "mask generator neural network" generates a scene layout for a digital image. In some cases, a mask generator neural network generates a digital image mask that indicates one or more regions of pixels to mask (and/or others to leave unmasked) within a digital image such as a background digital image or a foreground digital image. As another example, a "pixel generator neural network" generates pixel colors for a digital image. In some cases, a pixel generator neural network generates or determines pixel colors for all or part of a digital image such as a background digital image or a foreground digital image. In certain embodiments, the mask generator neural network and/or the pixel generator neural network generate their respective outputs from encoded features extracted via an encoder neural network.

As mentioned, the digital image collaging system can generate a collage digital image from a background digital image and a foreground digital image. As used herein, a "collage digital image" refers to an amalgam or a combination of two or more region-specific or layer-specific digital images such as a background digital image and a foreground digital image. In some cases, a collage digital image can depict pixels from a background digital image, a foreground digital image, and/or one or more additional digital images such as an intermediate digital image that depicts another layer (e.g., other than or between a background and foreground). Relatedly, a "background digital image" refers to a digital image including or depicting pixels belonging to a background region or a background layer of a digital image. Along these lines, a "foreground digital image" refers to a digital image depicting pixels belonging to a foreground region or a foreground layer of a digital image. In some cases, a background digital image and a foreground digital image are each an example of a "combined digital image," which refers to a digital image that includes or depicts a combination of a scene layout generated by a mask generator neural network and pixel colors generated by a pixel generator neural network.

As used herein, the term "scene layout" refers to an arrangement or structure of pixels within a digital image. For example, a scene layout includes indications of locations of pixels, such as pixels belonging to a particular layer or region of a digital image (e.g., background pixels and foreground pixels). In some embodiments, a scene layout can include, or be indicated or defined by, a digital image mask that indicates masked and/or unmasked pixels of one or more regions or layers (e.g., background and foreground) of a digital image.

Additional detail regarding the digital image collaging system will now be provided with reference to the figures. For example, FIG. 1 illustrates a schematic diagram of an example system environment for implementing a digital image collaging system 102 in accordance with one or more embodiments. An overview of the digital image collaging system 102 is described in relation to FIG. 1. Thereafter, a more detailed description of the components and processes of the digital image collaging system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 11.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 11. Although FIG. 1 illustrates a single instance of the client device 108, in some embodiments, the environment includes multiple different client devices, each associated with a different user (e.g., a digital content editor). The client device 108 communicates with the server(s) 104 via the network 114. For example, the client device 108 provides information to server(s) 104 indicating client device interactions (e.g., digital image selections, user interactions requesting generation of digital images, or other input) and receives information from the server(s) 104 such as generated collage digital images. Thus, in some cases, the digital image collaging system 102 on the server(s) 104 provides and receives information based on client device interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. Based on instructions from the client application 110, the client device 108 presents or displays information to a user, including digital images such as generated collage digital images, individual layers of a collage digital image (e.g., a background digital image and a foreground digital image), and/or selectable options for generating and editing digital images of scenes. In some cases, the client application 110 includes all or part of the digital image collaging system 102 and/or the digital image collaging neural network 116.

As illustrated in FIG. 1, the environment includes the server(s) 104. The server(s) 104 generates, tracks, stores, processes, receives, and transmits electronic data, such as indications of client device interactions and/or pixels of digital images. For example, the server(s) 104 receives data from the client device 108 in the form of an indication of a client device interaction to generate a collage digital image. In response, the server(s) 104 transmits data to the client device 108 to cause the client device 108 to display or present a collage digital image based on the client device interaction.

In some embodiments, the server(s) 104 communicates with the client device 108 to transmit and/or receive data via the network 114, including client device interactions, collage digital images, and/or other data. In some embodiments, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server. The server(s) 104 can further access and utilize the database 112 to store and retrieve information such as a digital image collaging neural network (e.g., the digital image collaging neural network 116), stored sample digital images for training, generated collage digital images, and/or generated features accessible by the digital image collaging neural network 116.

As further shown in FIG. 1, the server(s) 104 also includes the digital image collaging system 102 as part of a digital content editing system 106. For example, in one or more implementations, the digital content editing system 106 can store, generate, modify, edit, enhance, provide, distribute, and/or share digital content, such as digital images. For example, the digital content editing system 106 provides tools for the client device 108, via the client application 110, to generate digital images depicting scenes of landscapes, buildings, or other digital content.

In one or more embodiments, the server(s) 104 includes all, or a portion of, the digital image collaging system 102. For example, the digital image collaging system 102 operates on the server(s) to generate collage digital images. In some cases, the digital image collaging system 102 utilizes, locally on the server(s) 104 or from another network location (e.g., the database 112), a digital image collaging neural network 116 including one or more constituent neural networks such as an encoder neural network, a mask generator neural network, and/or a pixel generator neural network.

In certain cases, the client device 108 includes all or part of the digital image collaging system 102. For example, the client device 108 can generate, obtain (e.g., download), or utilize one or more aspects of the digital image collaging system 102, such as the digital image collaging neural network 116, from the server(s) 104. Indeed, in some implementations, as illustrated in FIG. 1, the digital image collaging system 102 is located in whole or in part on the client device 108. For example, the digital image collaging system 102 includes a web hosting application that allows the client device 108 to interact with the server(s) 104. To illustrate, in one or more implementations, the client device 108 accesses a web page supported and/or hosted by the server(s) 104.

The client device 108 and the server(s) 102 can work together to implement the digital image collaging system 102. For example, in some embodiments, the server(s) 102 train one or more neural networks discussed herein and provide the one or more neural networks to the client device 108 for implementation (e.g., to generate collage digital images at the client device 108). In some embodiments, the server(s) 102 train one or more neural networks, the client device 108 requests a collage digital image, the server(s) 102 generate a collage digital image utilizing the one or more neural networks and provide the collage digital image to the client device 108. Furthermore, in some implementations, the client device 108 can assist in training one or more neural networks.

Although FIG. 1 illustrates a particular arrangement of the environment, in some embodiments, the environment has a different arrangement of components and/or may have a different number or set of components altogether. For instance, as mentioned, the digital image collaging system 102 is implemented by (e.g., located entirely or in part on) the client device 108. In addition, in one or more embodiments, the client device 108 communicates directly with the digital image collaging system 102, bypassing the network 114. Further, in some embodiments, the digital image collaging neural network 116 is stored in the database 112, maintained by the server(s) 104, the client device 108, or a third-party device.

Figure 2:
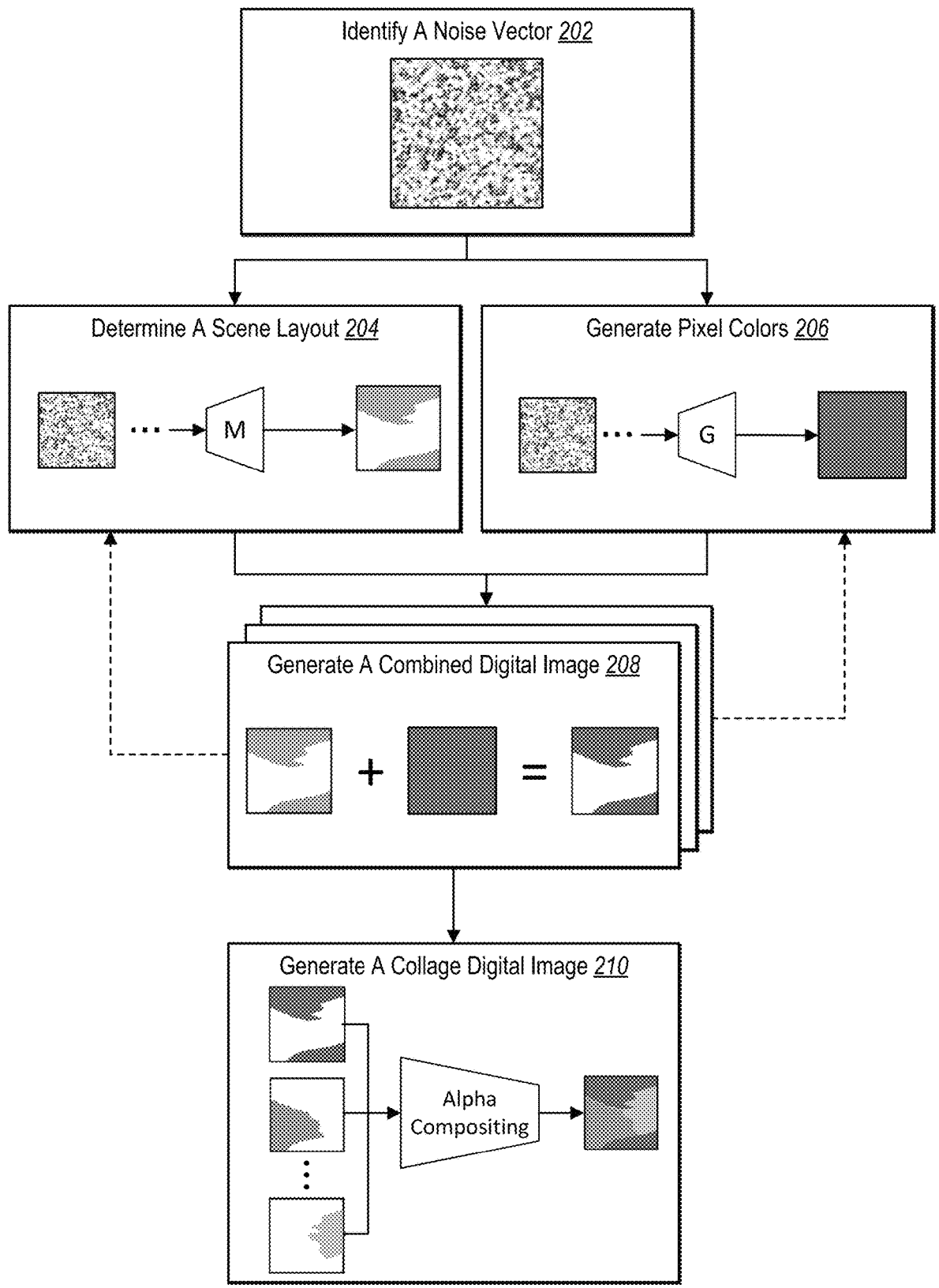
FIG. 2 illustrates an overview of generating a collage digital image utilizing a digital image collaging neural network in accordance with one or more embodiments.

As mentioned, in one or more embodiments, the digital image collaging system 102 generates a collage digital image by collaging together multiple region-specific digital images. In particular, the digital image collaging system 102 generates digital images representing different regions (e.g., a background digital image and a foreground digital image) by determining and combining scene layouts and pixels colors for each region. FIG. 2 illustrates an example sequence of acts for generating a collage digital image in accordance with one or more embodiments. The description of FIG. 2 provides an overview for generating a collage digital image, and additional detail regarding the individual acts is provided thereafter with reference to subsequent figures.

As illustrated in FIG. 2, the digital image collaging system 102 performs an act 202 to identify a noise vector. In particular, the digital image collaging system 102 identifies, receives, or generates a noise vector by determining a random sample of data such as pixel data or other digital image data. In certain implementations, the noise vector is a Gaussian noise vector. In some embodiments, the digital image collaging system 102 randomly samples a digital image or randomly generates a vector of data for input into a digital image collaging neural network (e.g., the digital image collaging neural network 116). In some cases, the digital image collaging system 102 further utilizes an encoder neural network (e.g., as part of the digital image collaging neural network 116) to extract, encode, or generate encoded features from the noise vector.

As further illustrated in FIG. 2, the digital image collaging system 102 performs an act 204 to determine a scene layout. More specifically, the digital image collaging system 102 determines a scene layout from a noise vector. For instance, the digital image collaging system 102 utilizes mask generator neural network (e.g., as part of the digital image collaging neural network 116) to generate or determine a scene layout from encoded features extracted by an encoder neural network. In some cases, the digital image collaging system 102 utilizes the mask generator neural network (represented by "M") to generate, from the noise vector, a scene layout in the form of a digital image mask that masks pixels of one or more regions of a digital image. Indeed, the digital image collaging system 102 generates a digital image mask that indicates masked pixels and/or unmasked pixels for a combined digital image.

Additionally, the digital image collaging system 102 performs an act 206 to generate pixel colors. Particularly, the digital image collaging system 102 generates pixel colors from the noise vector. For example, the digital image collaging system 102 utilizes a pixel generator neural network (e.g., as part of the digital image collaging neural network 116) to generate pixel colors from encoded features generated by the encoder neural network. In some cases, the digital image collaging system 102 utilizes the pixel generator neural network (represented by "G") to generate pixel colors for an entire combined digital image or for certain regions of a combined digital image.

In some embodiments, the digital image collaging system 102 performs the act 204 and the act 206 together or in tandem (e.g., simultaneously or contemporaneously) from the same noise vector. For instance, the digital image collaging system 102 applies the digital image collaging neural network 116 to the noise vector to extract encoded features (via the encoder neural network) and to generate both the scene layout and the pixel colors from the encoded features (via the mask generator neural network and the pixel generator neural network, respectively). In other embodiments, the digital image collaging system 102 performs either the act 204 or 206 before the other. For instance, the digital image collaging system 102 first performs the act 204 to determine a scene layout and then performs the act 206 to generate pixel colors (e.g., for only those pixels indicated by scene layout).

As further illustrated in FIG. 2, the digital image collaging system 102 performs an act 208 to generate a combined digital image. To elaborate, the digital image collaging system 102 generates a combined digital image by combining or merging the scene layout and the pixel colors. For example, the digital image collaging system 102 generates a combined digital image by applying the pixel colors to unmasked pixels indicated by a digital image mask of the scene layout. As shown, the digital image collaging system 102 generates the combined digital image by applying the dark gray pixel color to the two regions of (unmasked) pixels indicated by the scene layout, one at the top and the other at the bottom (with an irregularly shaped region of masked pixels in the middle).

In one or more embodiments, the digital image collaging system 102 repeats the process of generating a combined digital image multiple times. In particular, the digital image collaging system 102 performs multiple iterations or passes of the digital image collaging neural network, generating a separate combined digital image on each pass. For instance, the digital image collaging system 102 generates a background digital image on a first pass and generates a foreground digital image on a second pass. Indeed, the digital image collaging neural network 116 is capable of generating an overall image structure (as indicated by a background digital image) on a first pass and further capable of generating additional image detail such as objects and textures (as indicated by a foreground digital image) on a second pass.

To elaborate, the digital image collaging system 102 performs a first pass by generating, from a noise vector, a background scene layout utilizing a mask generator neural network and generating, from the noise vector, background pixel colors utilizing a pixel generator neural network. In addition, the digital image collaging system 102 performs a second pass by generating, from the noise vector, a foreground scene layout utilizing the mask generator neural network and generating, from the noise vector, foreground pixel colors utilizing the pixel generator neural network. In certain embodiments, instead of (or in addition to) using the noise vector, the digital image collaging system 102 utilizes the output (e.g., the background digital image) of a previous pass as input for a subsequent pass (e.g., to inform generating the foreground digital image). In these or other embodiments, each pass or iteration of the digital image collaging neural network 116 is performed with respect to the same noise vector and/or the same encoded features extracted from the noise vector.

In some cases, the digital image collaging system 102 performs more than two passes. Indeed, in some embodiments, the digital image collaging neural network 116 learns parameters for generating collage digital images from more than two combined digital images (e.g., by learning to extract intermediate features between background structure and foreground objects). For example, the digital image collaging system 102 generates a combined digital image in the form of an intermediate digital image which includes intermediate textures or objects between background and foreground (e.g., for improved perspective) or other objects in addition to the background structure and the foreground objects. Specifically, the digital image collaging system 102 generates an intermediate digital image via the acts illustrated in FIG. 2.

As further illustrated in FIG. 2, the digital image collaging system 102 performs an act 210 to generate a collage digital image. In particular, the digital image collaging system 102 generates a collage digital image by collaging together the two or more combined digital images generated over multiple iterations. For example, the digital image collaging system 102 utilizes alpha compositing (or some other blending technique) to combine or overlay the different digital images making up the regions of the collage digital image. As shown, the digital image collaging system 102 collages three (or more) combined digital images together (including a background digital image, a foreground digital image, and an intermediate digital image) to generate a collage digital image including separate regions with separate pixel colors (as indicated by the scene layouts and pixel colors generated for the respective images by the digital image collaging neural network). The digital image collaging system 102 can further provide the collage digital image for display on the client device 108.

Figure 3:
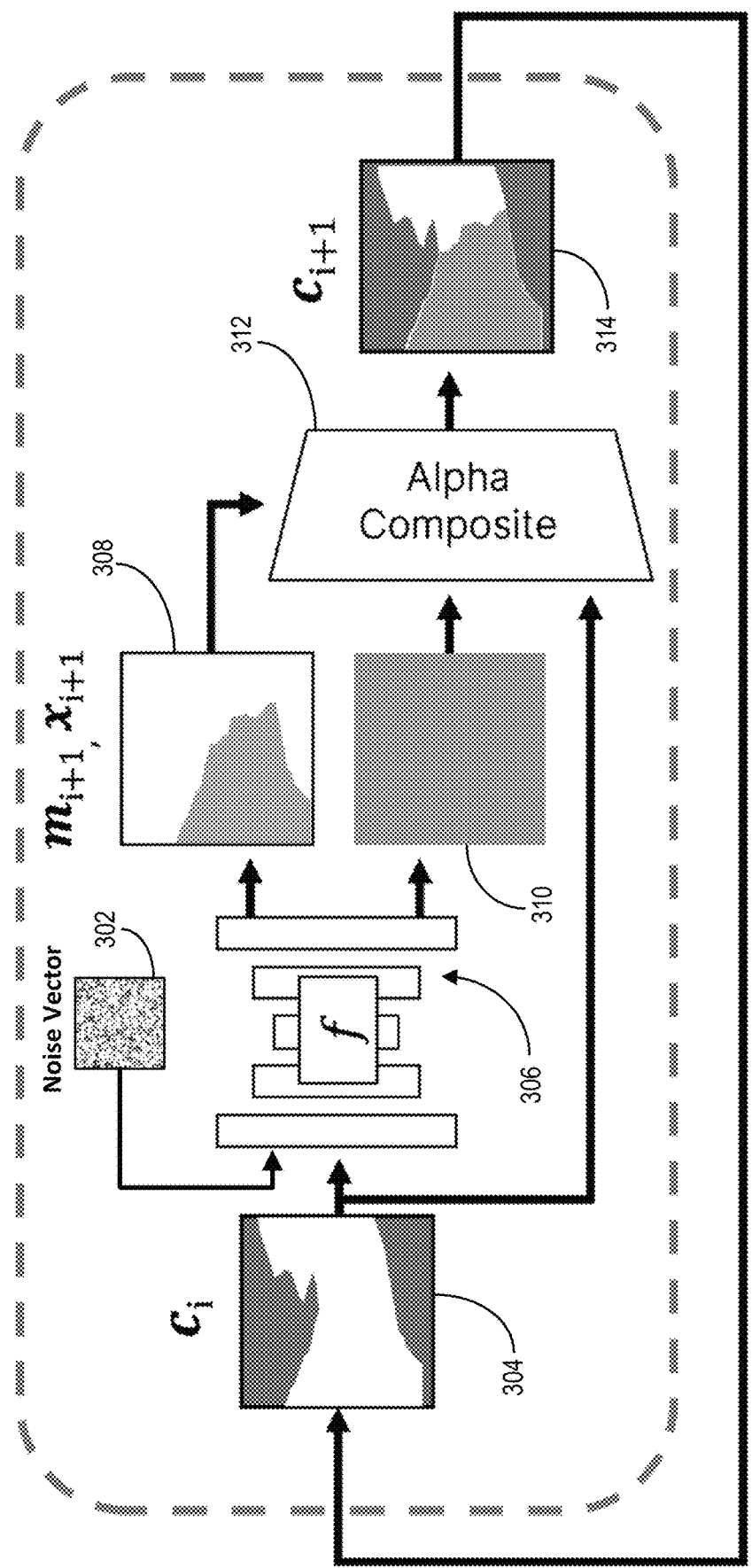
FIG. 3 illustrates an example pass through a digital image collaging neural network in accordance with one or more embodiments.

As mentioned above, in certain described embodiments, the digital image collaging system 102 generates a collage digital image utilizing a digital image collaging neural network. In particular, the digital image collaging system 102 utilizes a digital image collaging neural network that includes parameters learned via a training process to disentangle scene layouts and pixel colors. FIG. 3 illustrates an example of utilizing a digital image collaging neural network to generate a collage digital image in accordance with one or more embodiments.

As illustrated in FIG. 3, the digital image collaging system 102 performs two passes or iterations of a digital image collaging neural network 306 (e.g., the digital image collaging neural network 116). FIG. 3 generally illustrates a second pass after generating a first combined digital image 304. With the first pass, the digital image collaging system 102 generates the combined digital image 304 (e.g., a background digital image). Starting from an input of all zeros (e.g., an initialization digital image), on the first pass, the digital image collaging system 102 generates the combined digital image 304 using the noise vector 302 as a seed to start the process of generating a collage digital image. Indeed, the digital image collaging system 102 generates the combined digital image 304 by utilizing the digital image collaging neural network 306 to extract encoded features from the noise vector 302, to determine a scene layout from the encoded features, and to generate pixel colors from the encoded features. As described above, the digital image collaging system 102 further applies the pixel colors to unmasked pixels indicated by the scene layout to generate the combined digital image 304.

With the second pass, the digital image collaging system 102 generates an additional combined digital image from the combined digital image 304. For instance, the digital image collaging system 102 generates a second combined digital image by combining the scene layout 308 with the pixel colors 310. As shown, the digital image collaging system 102 generates the scene layout 308 and the pixel colors 310 from the combined digital image 304. In particular, the digital image collaging system 102 utilizes the digital image collaging neural network 306 to process or analyze the combined digital 304 by, for example, extracting features via an encoder neural network and utilizing the features for a mask generator neural network and a pixel generator neural network.

As mentioned above, the digital image collaging system 102 generates the subsequent combined digital image from the previous combined digital image 304. Thus, for additional iterations of the digital image collaging neural network 306, the digital image collaging system 102 utilizes previously generated combinations as input. For instance, to generate an additional combined digital image, the digital image collaging system 102 utilizes the collage digital image 314 as input. Indeed, the digital image collaging system 102 generates the collage digital image 314 by collaging together the combined digital image 304 (from the first pass) and the additional combined digital image (from the second pass) that results from the scene layout 308 and the pixel colors 310. In some cases, the digital image collaging system 102 utilizes alpha compositing 312 to combine the previous input with the newly generated combined digital image of the current iteration. In some embodiments, the digital image collaging system 102 generates a collage digital image (e.g., the collage digital image 314) according to the following:

$$c_{i+1} = x_i \odot m_i + c_i \odot (1-m_i)$$

where $c_i$ represents the collage digital image for the $i^{th}$ iteration or pass, $x_i$ represents the pixel colors for the $i^{th}$ iteration, and $m_i$ represents the scene layout for the $i^{th}$ iteration.

Figure 4B:
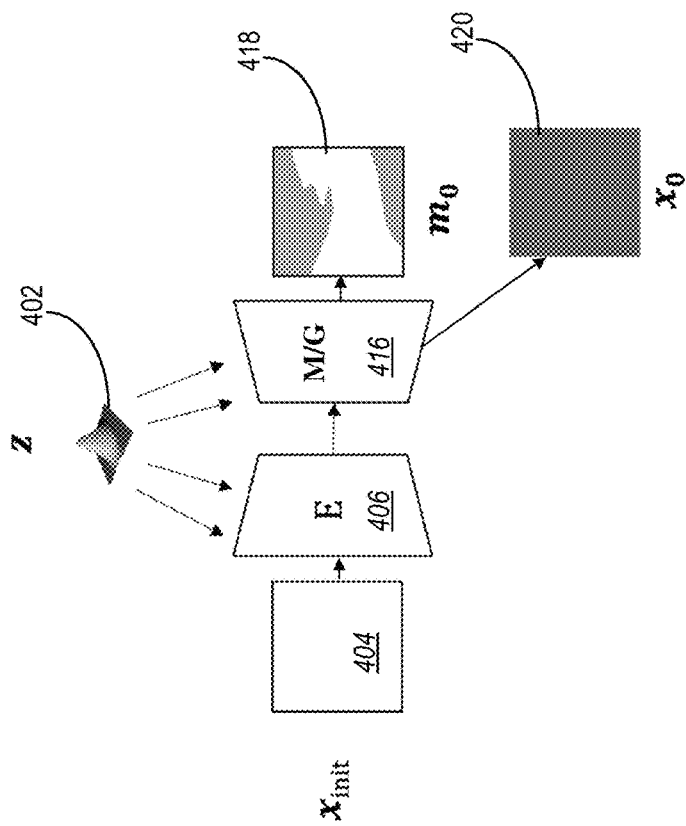
FIGS. 4A-4B illustrate example architectures for a digital image collaging neural network in accordance with one or more embodiments.
Figure 4A:
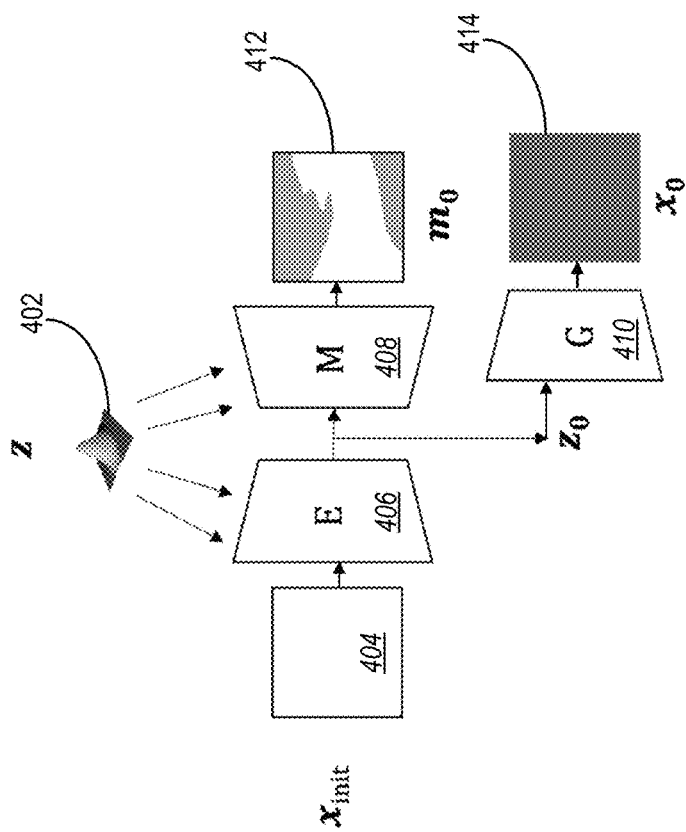

As mentioned, in certain embodiments, the digital image collaging system 102 generates region-specific combined digital images as part of ultimately generating a collage digital image. In particular, the digital image collaging system 102 generates combined digital images from scene layouts and pixel colors. FIGS. 4A-4B illustrate a single forward pass through example architectures for a digital image collaging neural network that the digital image collaging system 102 implements to generate combined digital images in accordance with one or more embodiments.

As illustrated in FIG. 4A, the digital image collaging neural network (e.g., the digital image collaging neural network 306) includes an encoder neural network 406, a mask generator neural network 408, and a pixel generator neural network 410. As shown, for an initial pass, the digital image collaging system 102 inputs an initialization digital image 404 (e.g., an empty image of all zeros) into the encoder neural network 406. Notably, for subsequent passes, the digital image collaging system 102 utilizes collages from previous iterations as input, as mentioned above. In addition to the initialization digital image 404 (represented by "$x_{init}$"), the digital image collaging system 102 inputs a noise vector 402 (represented by "z") into the encoder neural network 406 (represented by "E").

In one or more embodiments, utilizes the noise vector 402 is a global noise vector that is consistent between forward passes of the same iterative process (e.g., for generating the same collage digital image). In certain cases, the digital image collaging system 102 augments or modifies the noise vector 402 with positional encodings denoting the index of the forward pass (e.g., the first, second, or it forward pass). In one or more implementations, the digital image collaging system 102 uses the noise vector 402 for conditioning (e.g., modulating convolutional activations) the different components of the digital image collaging neural network (e.g., as part of training, which is described further in relation to FIGS. 5 and 6).

As shown, the digital image collaging system 102 utilize the encoder neural network 406 to generate encoded features (represented by "$z_0$") from the noise vector 402 (and/or from the initialization digital image 404). In addition, the digital image collaging system 102 passes the encoded features into the mask generator neural network 408 (represented by "M") and the pixel generator neural network (represented by "G"). In turn, the mask generator neural network 408 analyzes or process the encoded features to generate a scene layout 412 (represented by "$m_0$") in the form of a digital image mask that indicates regions of pixels to mask (and/or regions of pixels to leave unmasked). In some cases, the scene layout 412 is a digital image depicting regions of masked and/or unmasked pixels and having dimensions equal to the initialization digital image 404 (and a final collage digital image).

Additionally, the pixel generator neural network 410 processes or analyzes the encoded features to generate pixel colors 414 (represented by "$x_0$"). Specifically, the pixel generator neural network 410 generates a pixel color image having dimensions that match those of the initialization digital image 404 and the scene layout 412 (and a final collage digital image). Although FIG. 4A (and other figures) depicts the pixel colors 414 having a single color shade, this is merely illustrative, and the pixel colors 414 can be a variety of colors and textures in varying levels of detail, with different colors at different pixel locations.

In some embodiments, the pixel generator neural network 410 is a pre-trained, off-the-shelf neural network with frozen or fixed parameters. For example, in some implementations the pixel generator neural network 410 is all or part of a particular style generative adversarial network such as StyleGAN or StyleGAN2, as described by Tero Karras et al. in *Analyzing and Improving the Image Quality of StyleGAN*, Proceedings of IEEE, Conf. on Computer Vision and Pattern Recognition, 8110-8119 (2020). For instance, the digital image collaging system 102 can utilize the z-space and the w-space of StyleGAN2 for the mask generator neural network 408 and/or pixel generator neural network 410. In certain embodiments, the pixel generator neural network 410 is not frozen but is instead modifiable, including parameters learned through a training process as described in further detail in relation to FIGS. 5 and 6.

As illustrated in FIG. 4B, the digital image collaging system 102 utilizes a different architecture for the digital image collaging neural network. For example, the architecture of FIG. 4B does not include a pixel generator neural network that is separate from a mask generator neural network. Rather, as illustrated in FIG. 4B the pixel generator neural network is within (or part of) a mask-and-pixel generator neural network 416. Indeed, the mask-and-pixel generator neural network 416 of FIG. 4B includes parameters for both a mask generator neural network and a pixel generator neural network to generate a scene layout and pixel colors.

To elaborate, similar to the aforementioned process described in relation to FIG. 4A, the digital image collaging system 102 utilizes a noise vector 402 and an initialization digital image 404 as input into the digital image collaging neural network. In turn, the digital image collaging system 102 utilizes the encoder neural network 406 to generate encoded features from the noise vector 402 and/or the initialization digital image 404.

Further, the digital image collaging system 102 utilizes the mask-and-pixel generator neural network 416 to generate a scene layout 418 and pixel colors 420 from the encoded features. Specifically, the mask-and-pixel generator neural network 416 includes parameters trained to generate a digital image mask and to color unmasked pixels indicated by the digital image in single step. In some cases, the mask-and-pixel generator neural network 416 generates the scene layout 418 and the pixel colors 420 together, rather than as separate entities or images. For example, the mask-and-pixel generator neural network 416 generates a single output in the form of a combined digital image depicting a scene layout in generated pixel colors (without requiring an extra step to combine the separate outputs). Thus, rather than generating only a single-channel output like the mask generator neural network 408 of FIG. 4A, the mask-and-pixel generator neural network 416 generates a four-channel output, where one channel indicates a digital image mask (e.g., locations of masked pixels for the scene layout 418) and the other three channels indicated red, green, and blue (RGB) values at various pixel locations (for the pixel colors 420), respectively.

Figure 5:
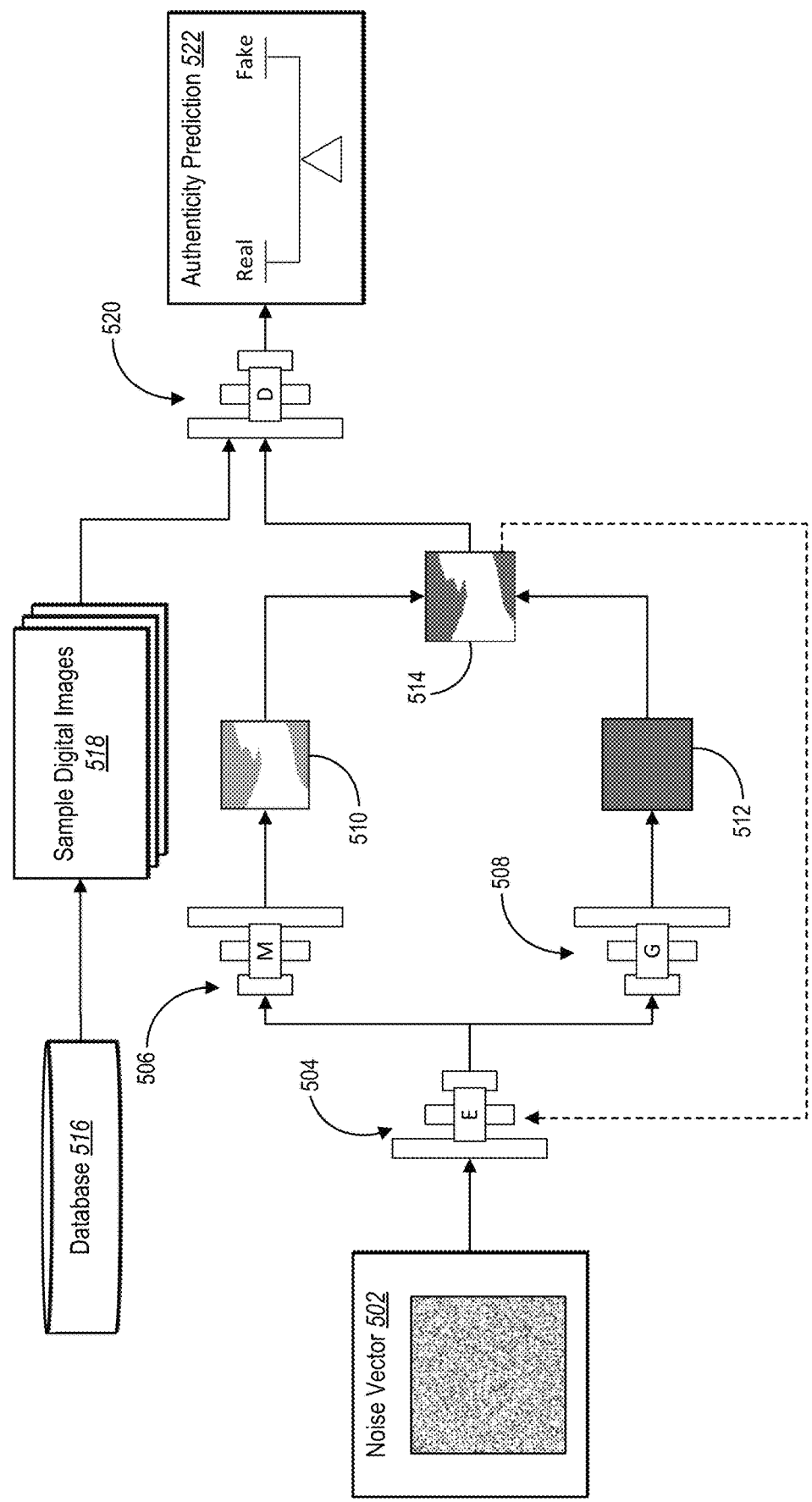
FIG. 5 illustrates an example training process for a digital image collaging neural network in accordance with one or more embodiments.

As mentioned above, in certain described embodiments, the digital image collaging system 102 learns parameters for a digital image collaging neural network. In particular, the digital image collaging system 102 utilizes an adversarial training process to tune or modify parameters of a digital image collaging neural network, including its internal neural networks such as an encoder neural network, a mask generator neural network, and/or a pixel generator neural network (or a mask-and-pixel generator neural network). FIG. 5 illustrates an example training process for learning parameters of a digital image collaging neural network in accordance with one or more embodiments.

As illustrated in FIG. 5, the digital image collaging system 102 utilizes a sample noise vector 502 (and/or a sample initialization digital image) as input into the encoder neural network 504. In turn, the encoder neural network 504 extracts or generates encoded features to pass to the mask generator neural network 506 and the pixel generator neural network 508. As described, the mask generator neural network 506 generates or determines a scene layout 510 from the encoded features, and the pixel generator neural network 508 generates pixel colors 512 from the encoded features. In addition, the digital image collaging system 102 combines the scene layout 510 and the pixel colors 512 to generate a combined digital image 514.

As described and illustrated, in some embodiments, the digital image collaging system 102 performs multiple passes through the encoder neural network 504, the mask generator neural network 506, and the pixel generator neural network 508 to generate a collage digital image. For example, the digital image collaging system 102 uses the combined digital image 514 as input for a second pass to generate an additional combined digital image for collaging together with the combined digital image 514. In these or other embodiments, the digital image collaging system 102 utilizes the collage digital image for comparison with a sample digital image 518.

As further illustrated in FIG. 5, the digital image collaging system 102 utilizes a discriminator neural network 520 as part of the training process. In particular, the digital image collaging system 102 accesses a sample digital image 518 from a database 516 (e.g., the database 112) and inputs the sample digital image 518 along with the combined digital image 514 (or a collage digital image generated over multiple passes) into the discriminator neural network 520. Based on comparing the sample digital image 518 and the combined digital image 514 (or a collage digital image), the discriminator neural network 520 generates an authenticity prediction 522 that includes a determination of whether the combined digital image 514 (or the collage digital image) is a real digital image (e.g., a non-generated digital image stored in the database 516) or a fake digital image (e.g., a digital image generated by the digital image collaging neural network).

In one or more embodiments, the digital image collaging system 102 further repeats the training process illustrated in FIG. 5 for multiple training iterations or epochs. Over successive training iterations, in certain cases, the digital image collaging system 102 generates a new combined digital image or collage digital image for comparison with a sample digital image. For example, the digital image collaging system 102 utilizes the combined digital image of the prior iteration (e.g., the combined digital image 514) as input for the subsequent iteration. In some cases, for each iteration, the digital image collaging system 102 utilizes a different noise vector (e.g., tens of thousands of different noise patterns over the entire training process) to generate a different combined digital image or collage digital image for comparison.

For each iteration, the encoder neural network 504 generates encoded features, and the mask generator neural network 506 and the pixel generator neural network 508 generate scene layouts and pixel colors, respectively. The digital image collaging system 102 further obtains a sample digital image from the database 516 to compare with the combined digital image of each iteration. The discriminator neural network 520, in turn, generates an authenticity prediction for each combined digital image of each iteration. The digital image collaging system 102 repeats the training process until the combined digital images generated by the neural networks 504-508 fool the discriminator neural network 520 into classifying them as real or non-generated (e.g., at least a threshold number of times consecutively or nonconsecutively).

In training the encoder neural network 504, the mask generator neural network 506, and/or the pixel generator neural network 508, in some embodiments the digital image collaging system 102 utilizes a minimax game between the neural network(s) 504-508 and the discriminator neural network 520. For example, the digital image collaging system 102 utilizes a minimax objective function given by:

$$\min_G \max_D \mathbb{E}_{x \sim p(x)}[\log D(x)] + \mathbb{E}_{z \sim p(z)}[\log (1 - D(G(z)))]$$

where G represents the digital image collaging neural network including the encoder neural network 504, the mask generator neural network 506, and the pixel generator neural network 508, and where z represents the (Gaussian) noise vector 502, x represents the combined digital image 514 (which is a combination of a scene layout $m_i$ and pixel colors $x_i$), and D represents the discriminator neural network 520. In some cases, the digital image collaging system 102 recasts the latter term as $-\log D(x)$, known as a non-saturating loss for providing improved gradients in early training.

In certain implementations, the digital image collaging system 102 determines $E(c_i)$ which gives a representation of the previous collage. The digital image collaging system 102 further pools and maps this representation utilizing a multilayer perceptron (MLP) g into an input for generator G (which includes one or more of the encoder neural network 504, the mask generator neural network 506, and/or the pixel generator neural network 508). The digital image collaging system 102 further utilizes the representation generated by the MLP in a U-Net fashion to generate the scene layout 510 (e.g., a digital image mask), $M(E(c_i))$. In some cases, the digital image collaging system 102 learns a mapping MLP f on top of the noise vector 502 ($z$) and uses f(z) to condition convolutions in the encoder neural network 504, the mask generator neural network 506, and/or the pixel generator neural network 508, along with an embedding $\phi_i$ of the current index in the iterative process.

Upon completion of an iterative process (over two or more passes), the digital image collaging system 102 generates a sequence of combined digital images $\{x_i, m_i\}$ which the digital image collaging system 102 composes into a collage digital image $x_{comp}$. As mentioned, the digital image collaging system 102 repeats the training process until the digital image collaging neural network generates an $x_{comp}$ that fools the discriminator neural network 520, modifying parameters (e.g., via backpropagation) at each training iteration to reduce or minimize one or more of the following losses (resulting from comparing an authenticity prediction with a ground truth indication of whether a digital image is real or fake) for the generator G and the discriminator D:

$$L_G = -\log D(x_{comp})$$

$$L_D = -\log D(x_{real}) + \log D(x_{comp})$$

where $L_G$ represents a generator (or GAN) loss associated with the encoder neural network 504, the mask generator neural network 506, and/or the pixel generator neural network 508, $L_D$ represents a discriminator loss associated with the discriminator neural network 520, and $x_{real}$ represents a real digital image (e.g., the sample digital image 518) drawn from a dataset within the database 516.

Figure 6:
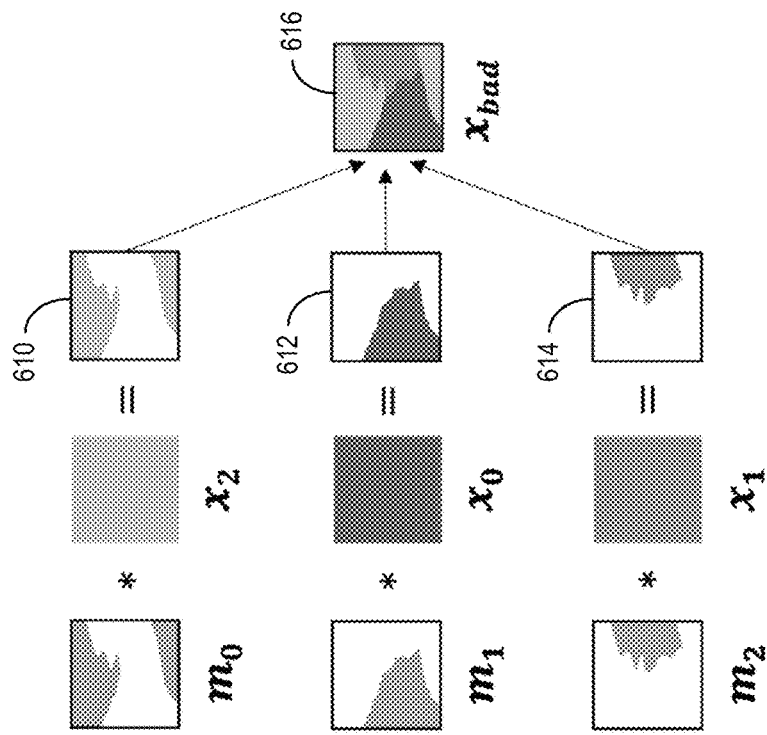
FIG. 6 illustrates example collage digital images for improving training of a digital image collaging neural network in accordance with one or more embodiments.
Figure 6:
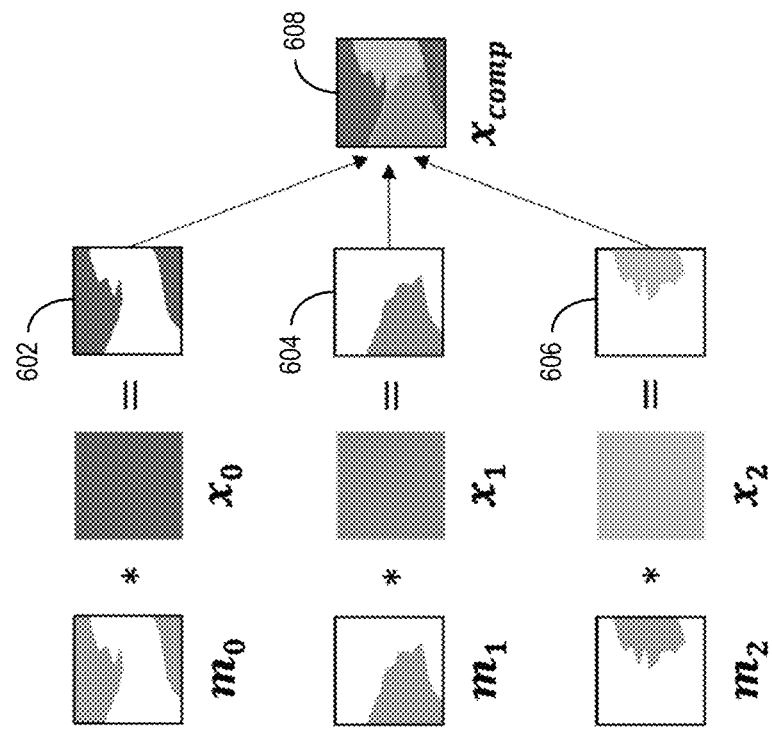

In one or more embodiments, the digital image collaging system 102 further improves on the aforementioned training process by preventing the digital image collaging neural network from cheating. In some practical scenarios, the images sampled at each forward pass may or may not vary, which results in the images collapsing to the same image as training proceeds (and collapses). Thus, the digital image collaging system 102 prevents this type of collapse by preventing the digital image collaging neural network from generating scene layouts and/or pixel colors that are all equal to 1 (using all pixels from all images). FIG. 6 illustrates example collage digital images the digital image collaging system 102 uses to prevent cheating and improve training for more accurate network parameters in accordance with one or more embodiments.

As illustrated in FIG. 6, the digital image collaging system 102 the digital image collaging system 102 generates two different collage digital images, the collage digital image 608 and the collage digital image 616. Indeed, as described herein, the digital image collaging system 102 generates the collage digital image 608 by collaging together digital images generated over three passes: a first pass to generate the combined digital image 602, a second pass to generate the combined digital image 604, and a third pass to generate the combined digital image 606. In like manner, the digital image collaging system 102 generates the collage digital image 616 from the combined digital image 610, the combined digital image 612, and the combined digital image 614.

To prevent the digital image collaging neural network from cheating, in some embodiments, the digital image collaging system 102 utilizes both good training examples like the collage digital image 608 which properly represents pixel colors in appropriate regions and bad training examples like the collage digital image 616 which improperly represents pixel colors in nonsensical regions (e.g., by swapping regions or making other mistakes). In some cases, instead of applying a digital image mask to its corresponding pixel color image, the digital image collaging system 102 permutes digital image masks and deliberately applies them incorrectly (a process call derangement), using mask $m_j$ for image $x_i$ where (i #j). The digital image collaging system 102 constrains the digital image collaging neural network such that the collage digital image 616 should not look real to the discriminator neural network 520. In certain embodiments, the digital image collaging system 102 adds an additional term to the generator loss:

$$L_G = -\log D(x_{comp}) + \log D(x_{bad})$$

where $x_{bad}$ represents the incorrect collage digital image 616 and $x_{comp}$ represents the correct collage digital image 608.

To further regulate the behavior of the mask generator neural network 506 and/or the pixel generator neural network 508 (or a mask-and-pixel generator neural network), and to further ground the training of the discriminator neural network 520, the digital image collaging system 102 penalizes deviation from the natural image manifold. For example, the digital image collaging system 102 constrains that the digital images (e.g., pixel color images) sampled from the pretrained generator (e.g., the pixel generator neural network) be real. As a result, the digital image collaging system 102 regulates the distribution of latents output by the learned digital image collage neural network, such that the losses become:

$$L_G = -\log D(x_{comp}) + \log D(x_{bad}) - \log D(x_{GAN})$$

$$L_D = -\log D(x_{real}) + \log D(x_{comp}) + \log D(x_{GAN})$$

where $x_{GAN}$ represents a digital image output by the pixel generator neural network.

In one or more embodiments, the digital image collaging system 102 kickstarts early training for the discriminator neural network 520 to prevent learning bad combinations such as visible seams between layers and/or nonsensically shaped regions. To provide an additional signal to the discriminator neural network 520, the digital image collaging system 102 generates random scene layouts or digital image masks and uses them to collage real digital images, resulting in unrealistic outputs. The digital image collaging system 102 trains the discriminator neural network 520 to classify these unrealistic digital images as fake with the following loss:

$$L_D = -\log D(x_{real}) + \log D(x_{comp}) + \log D(x_{GAN}) + \log D(x_{badmasks})$$

where $x_{badmasks}$ represents a digital image generated from random scene layouts. In some cases, the digital image collaging system 102 utilizes an R1 gradient regularization (as described by Tero Karras et al.) every 16 steps with a weight, such as λ=50 (or 10 or 100). In certain embodiments, the digital image collaging system 102 initializes the discriminator neural network 520 rather than from scratch to avoid mismatch with the generator by using weights given by the training process for G and D.

In one or more embodiments, the digital image collaging system 102 determines on one or more of the aforementioned losses (e.g., $L_G$ and $L_D$ in one or more of the above equations) by comparing a sample digital image (e.g., the sample digital image 518) with a generated collage digital image or combined digital image. Indeed, by comparing the images, the digital image collaging system 102 generates an authenticity prediction (e.g., the authenticity prediction 522) indicating whether the generated collage digital image is real or fake. In addition, the digital image collaging system 102 compares the authenticity prediction with a ground truth indication of whether a collage digital image is real or fake (resulting in one or more of measures of loss $L_G$ or $L_D$). In some cases, the digital image collaging system 102 generates a "bad" example (e.g., an incorrect collage digital image) and generates an authenticity prediction for the bad example as well (or in the alternative).

Further, the digital image collaging system 102 backpropagates to modify or update network parameters based on the authenticity prediction(s) (and/or based on the loss functions). For instance, the digital image collaging system 102 modifies parameters of the discriminator neural network 520, the encoder neural network 504, the mask generator neural network 506, and/or the pixel generator neural network 508 to reduce one or more measures of loss (e.g., according to the objective function indicated above). The digital image collaging system 102 can repeat the training process for many iterations until one or more measures of loss satisfy a threshold measure of loss.

In some embodiments, to generate a collage digital image shown for comparing with a sample digital image via the discriminator neural network 520, the digital image collaging system 102 spatially perturbs or jitters the corresponding background digital image and/or foreground digital image. To elaborate, the digital image collaging system 102 moves the foreground digital image or the background digital image a small distance in a given direction (e.g., five or ten pixels) and requires that the perturbed composition still fool the discriminator neural network 520. In some cases, this requirement further improves accuracy and realism of the digital image collaging system 102. Indeed, the digital image collaging system 102 learns or discovers more meaningful regions by requiring spatially perturbed images to fool the discriminator neural network 520 as part of training.

Figure 7:
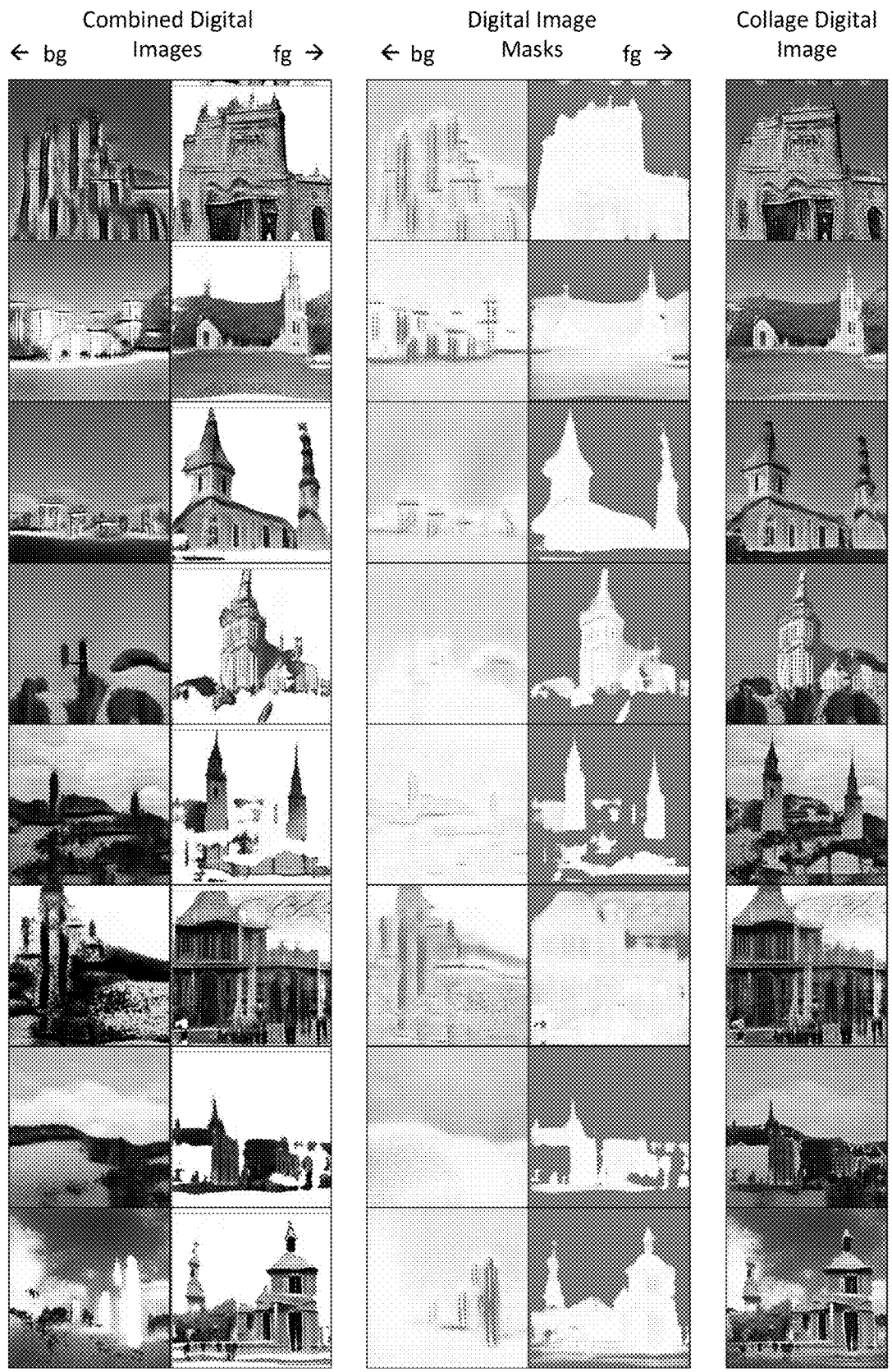
FIG. 7 illustrates example collage digital images, combined digital images, and digital image masks generated by the digital image collaging system in accordance with one or more embodiments.

As mentioned above, the digital image collaging system 102 generates accurate photorealistic images utilizing the trained digital image collaging neural network. In particular, the digital image collaging system 102 generates collage digital images depicting complex scenes such as buildings or landscapes that prior systems cannot accurately generate. FIG. 7 illustrates an example set of digital images generated by the digital image collaging system 102 in accordance with one or more embodiments.

As illustrated in FIG. 7, there are two columns of combined digital images, two columns of digital image masks or scene layouts, and one column of collage digital images (e.g., final outputs), where the images in each row correspond to one another. As shown, the digital image collaging system 102 performs two passes to generate combined digital images in the form of background ("bg") digital images and foreground ("fg") digital images. In some cases, the background digital images depict a generate layout or structure for the final result, while the foreground digital images depict foreground objects and additional detailed textures. To generate the background digital images and the foreground digital images, the digital image collaging system 102 generates background digital image masks and foreground digital image masks, respectively. Additionally, the digital image collaging system 102 generates the collage digital images by collaging (e.g., alpha compositing) the background digital images and the foreground digital images together.

Figure 8:
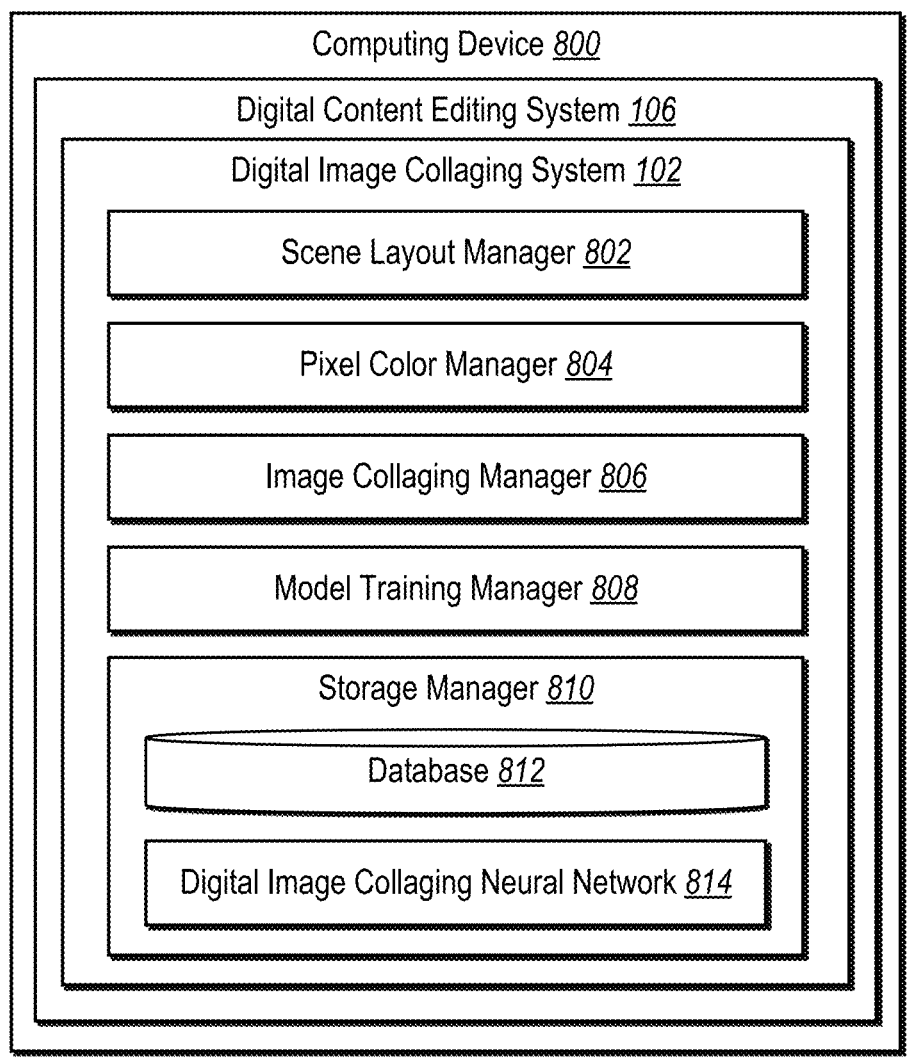
FIG. 8 illustrates a schematic diagram of a digital image collaging system in accordance with one or more embodiments.

Looking now to FIG. 8, additional detail will be provided regarding components and capabilities of the digital image collaging system 102. Specifically, FIG. 8 illustrates an example schematic diagram of the digital image collaging system 102 on an example computing device 800 (e.g., one or more of the client device 108 and/or the server(s) 104). As shown in FIG. 8, the digital image collaging system 102 includes a scene layout manager 802, a pixel color manager 804, an image collaging manager 806, a model training manager 808, and a storage manager 810.

As just mentioned, the digital image collaging system 102 includes a scene layout manager 802. In particular, the scene layout manager 802 manages, determines, generates, identifies, detects, extracts, or obtains a scene layout for generating a digital image. For example, the scene layout manager 802 generates a digital image mask that indicates regions of pixels to mask and/or to leave unmasked. In some cases, the scene layout manager 802 utilizes a mask generator neural network to generate a scene layout from encoded features extracted from a noise vector (e.g., utilizing an encoder neural network). The scene layout manager 802 can generate a scene layout for multiple passes of the digital image collaging neural network 814, such as for a background digital image mask and a foreground digital image mask.

In addition, the digital image collaging system 102 includes a pixel color manager 804. In particular, the pixel color manager 804 manages, determines, generates, identifies, detects, extracts, or obtains pixel colors for generating a digital image. For example, the pixel color manager 804 generates pixel color images utilizing a pixel generator neural network. In some cases, the pixel color manager 804 generates pixel colors from encoded features extracted from a noise vector. The pixel color manager 804 can generate pixel colors for multiple passes of the digital image collaging neural network 814, such as for background pixel colors and foreground pixel colors.

As further illustrated in FIG. 8, the digital image collaging system 102 includes an image collaging manager 806. In particular, the image collaging manager 806 manages, maintains, generates, determines, collages, combines, composes, or identifies collage digital images. For example, the image collaging manager 806 generates a collage digital image by combining or merging one or more combined digital images. In some cases, the image collaging manager 806 generates combined digital images by combining scene layouts and pixel colors, and the image collaging manager 806 further generates collage digital images by combining combined digital images. For instance, the image collaging manager 806 generates a background digital image and a foreground digital image and composes a collage digital image by alpha compositing the background digital image and the foreground digital image.

Additionally, the digital image collaging system 102 includes a model training manager 808. In particular, the model training manager 808 manages, maintains, trains, tunes, determines, learns, updates, modifies, or identifies parameters of the digital image collaging neural network 814. For example, using the training process described above, the model training manager 808 trains components of the digital image collaging neural network 814, such as an encoder neural network, a mask generator neural network, and/or a pixel generator neural network.

The digital image collaging system 102 further includes a storage manager 810. The storage manager 810 operates in conjunction with, or includes, one or more memory devices such as the database 812 (e.g., the database 112) that stores various data such as sample digital images for training and/or the digital image collaging neural network 814.

In one or more embodiments, each of the components of the digital image collaging system 102 are in communication with one another using any suitable communication technologies. Additionally, the components of the digital image collaging system 102 is in communication with one or more other devices including one or more client devices described above. It will be recognized that although the components of the digital image collaging system 102 are shown to be separate in FIG. 8, any of the subcomponents may be combined into fewer components, such as into a single component, or divided into more components as may serve a particular implementation. Furthermore, although the components of FIG. 8 are described in connection with the digital image collaging system 102, at least some of the components for performing operations in conjunction with the digital image collaging system 102 described herein may be implemented on other devices within the environment.

The components of the digital image collaging system 102 can include software, hardware, or both. For example, the components of the digital image collaging system 102 can include one or more instructions stored on a computer-readable storage medium and executable by processors of one or more computing devices (e.g., the computing device 800). When executed by the one or more processors, the computer-executable instructions of the digital image collaging system 102 can cause the computing device 800 to perform the methods described herein. Alternatively, the components of the digital image collaging system 102 can comprise hardware, such as a special purpose processing device to perform a certain function or group of functions. Additionally, or alternatively, the components of the digital image collaging system 102 can include a combination of computer-executable instructions and hardware.

Furthermore, the components of the digital image collaging system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the digital image collaging system 102 may be implemented as part of a stand-alone application on a personal computing device or a mobile device. Alternatively, or additionally, the components of the digital image collaging system 102 may be implemented in any application that allows creation and delivery of content to users, including, but not limited to, applications in ADOBE® EXPERIENCE MANAGER and CREATIVE CLOUD®, such as PHOTOSHOP®, LIGHTROOM®, and INDESIGN®. "ADOBE," "ADOBE EXPERIENCE MANAGER," "CREATIVE CLOUD," "PHOTOSHOP," "LIGHTROOM," and "INDESIGN" are either registered trademarks or trademarks of Adobe Inc. in the United States and/or other countries.

FIGS. 1-8 the corresponding text, and the examples provide a number of different systems, methods, and non-transitory computer readable media for generating collage digital images utilizing a digital image collaging neural network. In addition to the foregoing, embodiments can also be described in terms of flowcharts comprising acts for accomplishing a particular result. For example, FIGS. 9-10 illustrates flowcharts of an example sequences or series of acts in accordance with one or more embodiments.

Figure 9:
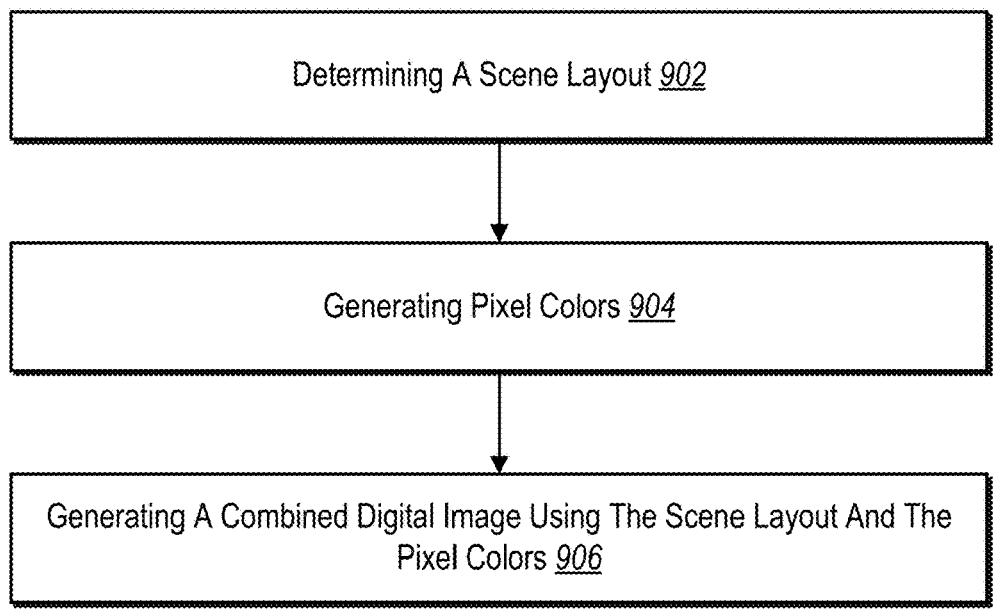
FIG. 9 illustrates a flowchart of a series of acts for generating a combined digital image utilizing a digital image collaging neural network in accordance with one or more embodiments.
Figure 10:
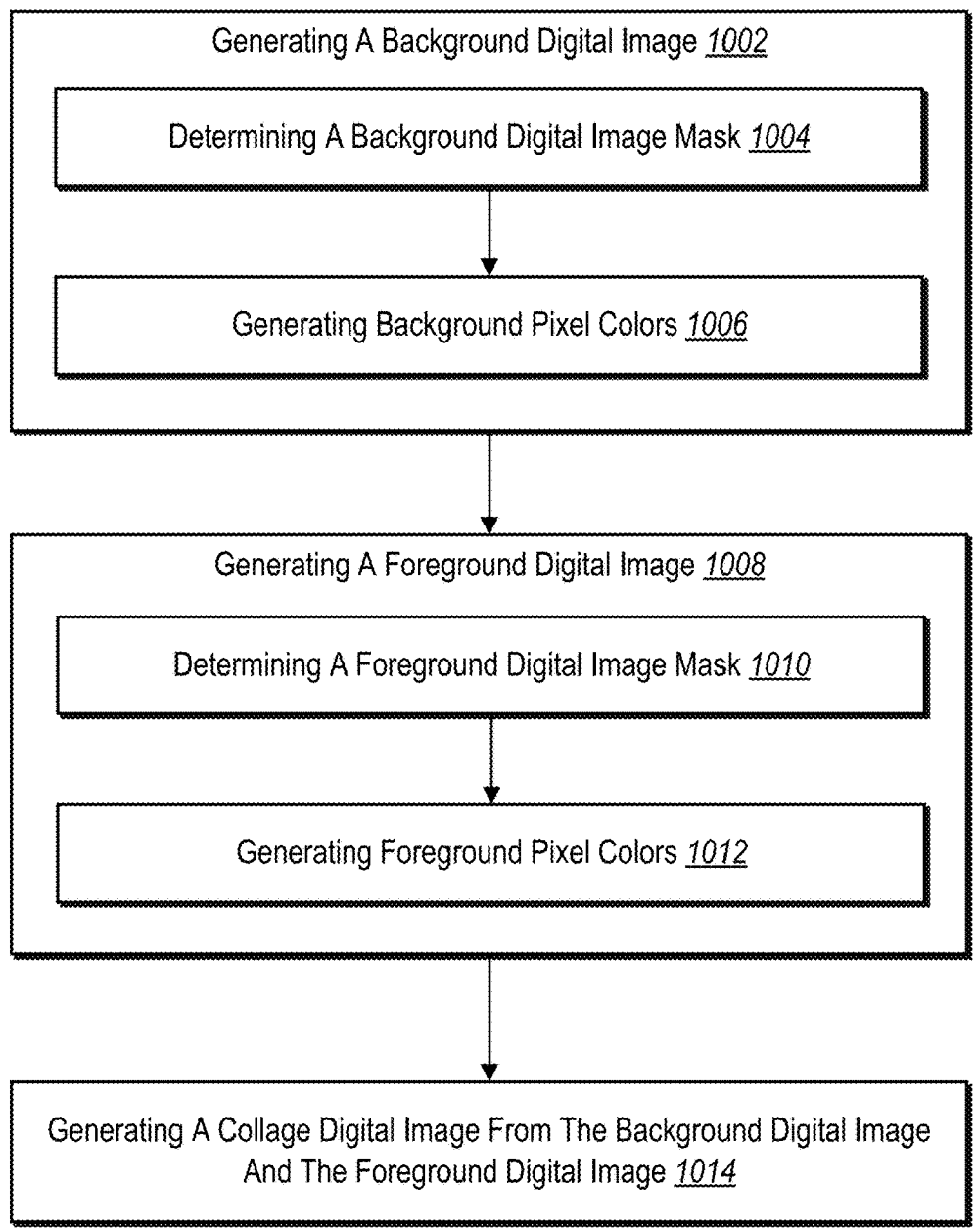
FIG. 10 illustrates a flowchart of a series of acts for generating a collage digital image utilizing a digital image collaging neural network in accordance with one or more embodiments.

While FIGS. 9-10 illustrates acts according to particular embodiments, alternative embodiments may omit, add to, reorder, and/or modify any of the acts shown in FIGS. 9-10. The acts of FIGS. 9-10 can be performed as part of a method. Alternatively, a non-transitory computer readable medium can comprise instructions, that when executed by one or more processors, cause a computing device to perform the acts of FIGS. 9-10. In still further embodiments, a system can perform the acts of FIGS. 9-10. Additionally, the acts described herein may be repeated or performed in parallel with one another or in parallel with different instances of the same or other similar acts.

FIG. 9 illustrates an example series of acts 900 for generating a combined digital image utilizing a digital image collaging neural network. In particular, the series of acts 900 includes an act 902 of determining a scene layout. For example, the act 902 involves determining a scene layout from a noise vector by utilizing a mask generator neural network to generate a digital image mask. In some cases, the act 902 involves utilizing the mask generator neural network to generate, from the noise vector, a digital image mask that indicates one or more regions of the combined digital image to mask.

In certain embodiments, the series of acts includes an act of generating encoded features for the combined digital image utilizing the encoder neural network. The act 902 can thus include determining a scene layout from the encoded features by utilizing the mask generator neural network to generate a digital image mask. Generating the encoded features can involve extracting the encoded features from a noise vector utilizing the encoder neural network. In one or more implementations, the act 902 involves utilizing the mask generator neural network to generate, from the encoded features, the digital image mask indicating masked regions and unmasked regions for the combined digital image.

As shown, the series of acts 900 includes an act 904 of generating pixel colors. In particular, the act 904 involves generating pixel colors for the combined digital image utilizing a pixel generator neural network. For example, the act 904 involves utilizing the pixel generator neural network to determine, from the noise vector, colors for pixels of the combined digital image. In some cases, the act 904 includes generating pixel colors from the encoded features utilizing the pixel generator neural network. In certain embodiments, the act 904 involves utilizing the pixel generator neural network to determine colors for pixels within the unmasked regions for the combined digital image. In one or more implementations, the act 904 involves utilizing a frozen pixel generator neural network comprising fixed parameters learned independently from collaging digital images with the digital image collaging neural network. In certain cases, the act 904 includes utilizing a modifiable pixel generator neural network comprising adjustable parameters learned as part of collaging digital images with the digital image collaging neural network.

Further, the series of acts 900 includes an act 906 of generating a combined digital image using the scene layout and the pixel colors. In particular, the act 906 involves generating the combined digital image by combining the scene layout and the pixel colors. For example, the act 906 involves utilizing the pixel colors for pixels within unmasked regions of the scene layout. In some cases, the act 906 involves generating, utilizing the digital image collaging neural network, the combined digital image depicting the scene layout in the pixel colors. For instance, the act 906 includes applying the pixel colors to pixels indicated by the scene layout.

In some cases, the series of acts 900 includes an act of generating an additional combined digital image by utilizing the mask generator neural network to determine an additional scene layout and utilizing the pixel generator neural network to generate additional pixel colors. Further, the series of acts 900 can include an act of generating a collage digital image comprising the combined digital image and the additional combined digital image. In one or more embodiments, the series of acts 900 includes an act of generating encoded features from the noise vector utilizing an encoder neural network and an act of determining the scene layout and generating the pixel colors from the encoded features. In some implementations, the series of acts 900 includes an act of learning parameters for the mask generator neural network and the pixel generator neural network utilizing a discriminator neural network to generate an authenticity prediction for the combined digital image.

FIG. 10 illustrates an example series of acts 1000 for generating a collage digital image utilizing a digital image collaging neural network. In particular, the series of acts 1000 includes an act 1002 of generating a background digital image. For example, the act 1002 includes additional acts such as the act 1004 of determining a background digital image mask and the act 1006 of generating background pixel colors. In some cases, the act 1004 involves determining a background digital image mask utilizing a mask generator neural network.

In one or more implementations, the act 1004 involves utilizing the mask generator neural network to determine, from a noise vector, masked regions and unmasked regions for composing the background digital image. Additionally, the act 1006 can involve generating background pixel colors for pixels indicated by the background digital image mask utilizing a pixel generator neural network. In some cases, the act 1006 involves utilizing the pixel generator neural network to determine, from the noise vector, colors for pixels of the unmasked regions for composing the background digital image. In certain embodiments, the act 1002 includes utilizing a digital image collaging neural network including the mask generator neural network and the pixel generator neural network to generate a combined digital image depicting the background pixel colors at unmasked pixels indicated by the background digital image mask.

As further illustrated in FIG. 10, the series of acts 1000 includes an act 1008 of generating a foreground digital image. In particular, the act 1008 includes additional acts such as the act 1010 of determining a foreground digital image mask and the act 1012 of generating foreground pixel colors. For example, the act 1010 includes determining a foreground digital image mask utilizing the mask generator neural network. In one or more embodiments, the act 1010 involves utilizing the mask generator neural network to determine, from the noise vector, masked regions and unmasked regions for composing the foreground digital image. In certain implementations, the act 1012 involves utilizing the pixel generator neural network to determine, from the noise vector, colors for pixels of the unmasked regions for composing the foreground digital image.

In some cases, the act 1012 involves generating foreground pixel colors for pixels indicated by the foreground digital image mask utilizing the pixel generator neural network. In certain embodiments, the act 1008 involves utilizing the digital image collaging neural network to generate the foreground digital image mask and the foreground pixel colors from the combined digital image.

Additionally, the series of acts 1000 includes an act 1014 of generating a collage digital image from the background digital image and the foreground digital image. In particular, the act 1014 involves generating a collage digital image comprising the background digital image and the foreground digital image. For example, the act 1014 includes combining the background digital image and the foreground digital image via alpha compositing.

In one or more embodiments, the series of acts 1000 includes an act of generating an intermediate digital image. Generating the intermediate digital image can involve determining an intermediate digital image mask utilizing the mask generator neural network and generating intermediate pixel colors for pixels indicated by the intermediate digital image mask utilizing the pixel generator neural network. Additionally, the series of acts 1000 can include an act of generating an additional collage digital image comprising the background digital image, the foreground digital image, and the intermediate digital image.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
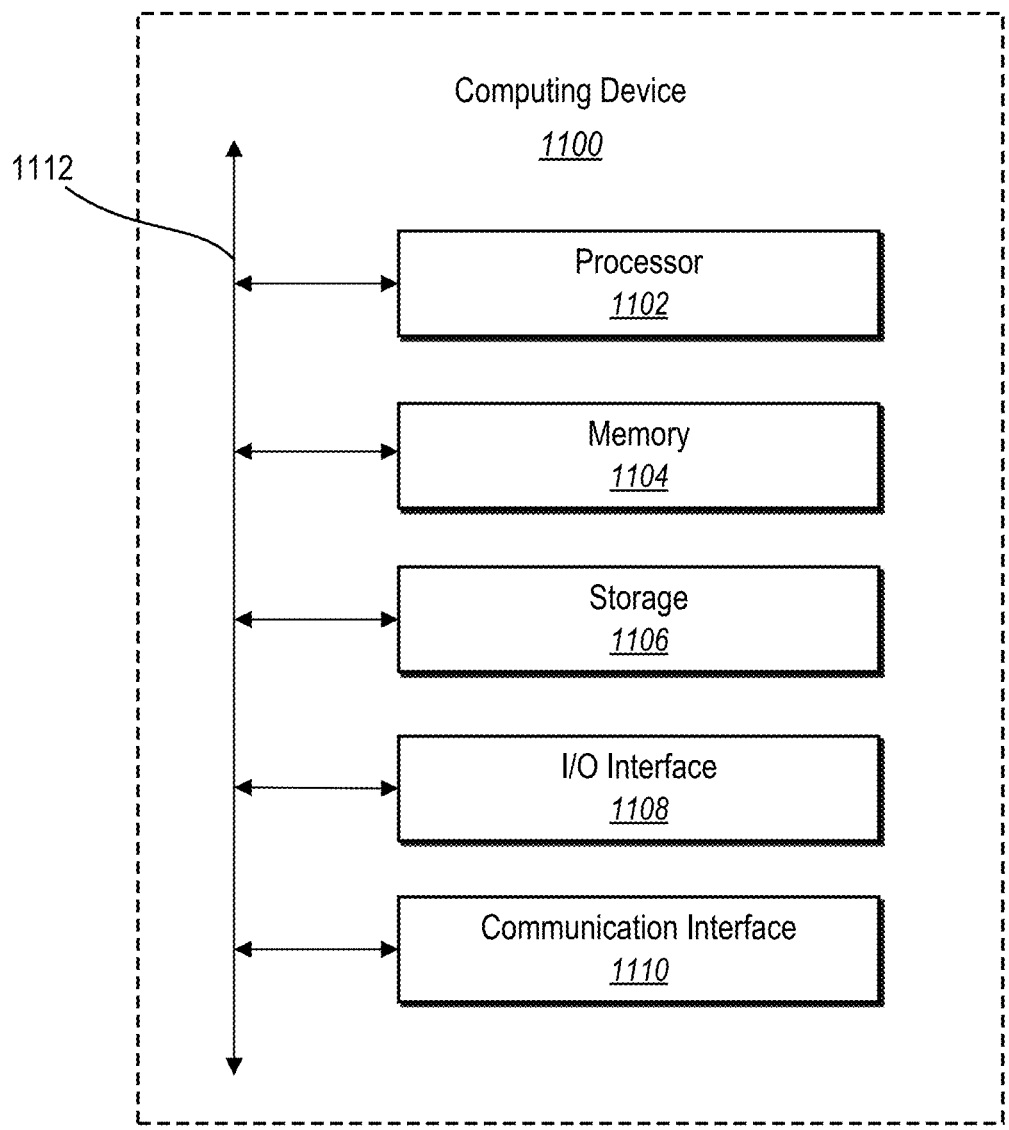
FIG. 11 illustrates a block diagram of an example computing device in accordance with one or more embodiments.

FIG. 11 illustrates, in block diagram form, an example computing device 1100 (e.g., the computing device 800, the client device 108, and/or the server(s) 104) that may be configured to perform one or more of the processes described above. One will appreciate that the digital image collaging system 102 can comprise implementations of the computing device 1100. As shown by FIG. 11, the computing device can comprise a processor 1102, memory 1104, a storage device 1106, an I/O interface 1108, and a communication interface 1110. Furthermore, the computing device 1100 can include an input device such as a touchscreen, mouse, keyboard, etc. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1106 and decode and execute them.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1104 may be internal or distributed memory.

The computing device 1100 includes a storage device 1106 includes storage for storing data or instructions. As an example, and not by way of limitation, storage device 1106 can comprise a non-transitory storage medium described above. The storage device 1106 may include a hard disk drive (HDD), flash memory, a Universal Serial Bus (USB) drive or a combination of these or other storage devices.

The computing device 1100 also includes one or more input or output ("I/O") devices/interfaces 1108, which are provided to allow a user to provide input to (such as user strokes), receive output from, and otherwise transfer data to and from the computing device 1100. These I/O devices/interfaces 1108 may include a mouse, keypad or a keyboard, a touch screen, camera, optical scanner, network interface, modem, other known I/O devices or a combination of such I/O devices/interfaces 1108. The touch screen may be activated with a writing device or a finger.

The I/O devices/interfaces 1108 may include one or more devices for presenting output to a user, including, but not limited to, a graphics engine, a display (e.g., a display screen), one or more output drivers (e.g., display drivers), one or more audio speakers, and one or more audio drivers. In certain embodiments, devices/interfaces 1108 is configured to provide graphical data to a display for presentation to a user. The graphical data may be representative of one or more graphical user interfaces and/or any other graphical content as may serve a particular implementation.

The computing device 1100 can further include a communication interface 1110. The communication interface 1110 can include hardware, software, or both. The communication interface 1110 can provide one or more interfaces for communication (such as, for example, packet-based communication) between the computing device and one or more other computing devices 1100 or one or more networks. As an example, and not by way of limitation, communication interface 1110 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

In the foregoing specification, the invention has been described with reference to specific example embodiments thereof. Various embodiments and aspects of the invention (s) are described with reference to details discussed herein, and the accompanying drawings illustrate the various embodiments. The description above and drawings are illustrative of the invention and are not to be construed as limiting the invention. Numerous specific details are described to provide a thorough understanding of various embodiments of the present invention.

The present invention may be embodied in other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium storing instructions thereon that, when executed by at least one processor, cause a computing device to compose a combined digital image by performing operations comprising:
   determining a scene layout from a noise vector by utilizing a mask generator neural network to generate a digital image mask;
   generating pixel colors for the combined digital image utilizing a pixel generator neural network; and
   generating the combined digital image by combining the scene layout and the pixel colors.

2. The non-transitory computer readable medium of claim 1, further storing instructions that, when executed by the at least one processor, cause the computing device to perform operations comprising:
   generating an additional combined digital image by utilizing the mask generator neural network to determine an additional scene layout and utilizing the pixel generator neural network to generate additional pixel colors; and generating a collage digital image comprising the combined digital image and the additional combined digital image.

3. The non-transitory computer readable medium of claim 1, wherein determining the scene layout from the noise vector comprises utilizing the mask generator neural network to generate, from the noise vector, a digital image mask that indicates one or more regions of the combined digital image to mask.

4. The non-transitory computer readable medium of claim 1, wherein generating the pixel colors comprises utilizing the pixel generator neural network to determine, from the noise vector, colors for pixels of the combined digital image.

5. The non-transitory computer readable medium of claim 1, wherein generating the combined digital image comprises utilizing the pixel colors for pixels within unmasked regions of the scene layout.

6. The non-transitory computer readable medium of claim 1, further storing instructions that, when executed by the at least one processor, cause the computing device to perform operations comprising:
generating encoded features from the noise vector utilizing an encoder neural network; and
determining the scene layout and generating the pixel colors from the encoded features.

7. The non-transitory computer readable medium of claim 1, further storing instructions that, when executed by the at least one processor, cause the computing device to perform operations comprising learning parameters for the mask generator neural network and the pixel generator neural network utilizing a discriminator neural network to generate an authenticity prediction for the combined digital image.

8. A system comprising:
one or more memory devices comprising a digital image collaging neural network including an encoder neural network, a mask generator neural network, and a pixel generator neural network; and
one or more processors configured to cause the system to compose a combined digital image by:
generating encoded features for the combined digital image utilizing the encoder neural network;
determining a scene layout from the encoded features by utilizing the mask generator neural network to generate a digital image mask;
generating pixel colors from the encoded features utilizing the pixel generator neural network; and
generating, utilizing the digital image collaging neural network, the combined digital image depicting the scene layout in the pixel colors.

9. The system of claim 8, wherein generating the combined digital image comprises applying the pixel colors to pixels indicated by the scene layout.

10. The system of claim 8, wherein generating the encoded features for the combined digital image comprises extracting the encoded features from a noise vector utilizing the encoder neural network.

11. The system of claim 8, wherein determining the scene layout comprises utilizing the mask generator neural network to generate, from the encoded features, the digital image mask indicating masked regions and unmasked regions for the combined digital image.

12. The system of claim 11, wherein generating the pixel colors comprises utilizing the pixel generator neural network to determine colors for pixels within the unmasked regions for the combined digital image.

13. The system of claim 8, wherein generating the pixel colors comprises utilizing a frozen pixel generator neural network comprising fixed parameters learned independently from collaging digital images with the digital image collaging neural network.

14. The system of claim 8, wherein generating the pixel colors comprises utilizing a modifiable pixel generator neural network comprising adjustable parameters learned as part of collaging digital images with the digital image collaging neural network.

* * * * *